US011935024B1

(12) United States Patent
Cziraky-Stanley et al.

(10) Patent No.: US 11,935,024 B1
(45) Date of Patent: Mar. 19, 2024

(54) ACCOUNT-BASED DATA AND MARKETPLACE GENERATION

(71) Applicant: Block, Inc., San Francisco, CA (US)

(72) Inventors: Christopher Cziraky-Stanley, San Francisco, CA (US); Ryan Tai, Mountain View, CA (US); Brian Mullins, San Francisco, CA (US)

(73) Assignee: Block, Inc., Oakland, CA (US)

(*) Notice: Subject to any disclaimer, the term of this patent is extended or adjusted under 35 U.S.C. 154(b) by 0 days.

(21) Appl. No.: 16/999,343

(22) Filed: Aug. 21, 2020

Related U.S. Application Data

(63) Continuation of application No. 15/789,678, filed on Oct. 20, 2017, now abandoned.

(51) Int. Cl.
*G06Q 20/20* (2012.01)
*G06Q 20/38* (2012.01)

(52) U.S. Cl.
CPC ......... *G06Q 20/202* (2013.01); *G06Q 20/382* (2013.01)

(58) Field of Classification Search
CPC .... G06Q 20/202; G06Q 20/382; G06Q 40/00; G06Q 10/0637
USPC .......................................................... 705/21
See application file for complete search history.

(56) References Cited

U.S. PATENT DOCUMENTS

| | | | |
|---|---|---|---|
| 6,839,682 B1 | 1/2005 | Blume et al. | |
| 7,769,640 B2 | 8/2010 | Klenske | |
| 7,857,212 B1 | 12/2010 | Matthews | |
| 8,055,548 B2 | 11/2011 | Staib et al. | |
| 8,504,455 B1* | 8/2013 | Balestreire | G06Q 40/02 705/35 |
| 8,805,090 B1 | 8/2014 | Yagnik et al. | |
| 10,671,952 B1* | 6/2020 | Chang | G06Q 10/06315 |
| 10,802,745 B1* | 10/2020 | Bozicevich | G06F 3/0637 |
| 11,210,721 B1 | 12/2021 | Feng | |
| 2001/0018665 A1 | 8/2001 | Sullivan et al. | |
| 2003/0004739 A1 | 1/2003 | Mcever | |
| 2004/0059658 A1* | 3/2004 | Sosville | G06Q 40/00 705/35 |
| 2004/0243468 A1 | 12/2004 | Cohagan et al. | |
| 2005/0015333 A1* | 1/2005 | Schwerin-Wenzel | G06Q 20/10 705/39 |

(Continued)

OTHER PUBLICATIONS

Skeels C. and Patel Y., "Caviar's Word2Vec tagging for menu item recommendations", Square corner Blob (Jan. 29, 2018), pp. 1-14.

(Continued)

*Primary Examiner* — Luna Champagne
(74) *Attorney, Agent, or Firm* — Lee & Hayes P.C.

(57) ABSTRACT

Systems and methods for generation and aggregation of point-of-sale account data and generation of a marketplace platform are disclosed. Transaction information may be utilized to value one or more businesses, and those valuations may be presented to potential buyers in a generated marketplace platform. A remote system may facilitate a sales agreement between a buying merchant and a seller merchant by, for example, transferring funds from a remote system account to the selling merchant's account and accepting repayment from the buying merchant over time. Merging of transaction information and/or user accounts pursuant to the sales agreement may also be performed.

20 Claims, 9 Drawing Sheets

(56) References Cited

U.S. PATENT DOCUMENTS

| | | | |
|---|---|---|---|
| 2005/0071174 A1* | 3/2005 | Leibowitz | G06Q 50/184 |
| | | | 705/310 |
| 2006/0229806 A1 | 10/2006 | Forlenza et al. | |
| 2008/0027818 A1 | 1/2008 | Broadhead | |
| 2008/0082373 A1 | 4/2008 | Durocher et al. | |
| 2009/0030845 A1* | 1/2009 | Hurry | H04L 9/12 |
| | | | 705/50 |
| 2009/0090783 A1 | 4/2009 | Killian et al. | |
| 2009/0164330 A1* | 6/2009 | Bishop | G06Q 20/202 |
| | | | 705/19 |
| 2009/0271275 A1 | 10/2009 | Regmi et al. | |
| 2010/0023371 A1* | 1/2010 | Hartz | G06Q 30/0601 |
| | | | 705/26.1 |
| 2010/0153174 A1 | 6/2010 | Angell et al. | |
| 2010/0280880 A1 | 11/2010 | Faith et al. | |
| 2011/0015987 A1 | 1/2011 | Chakraborty et al. | |
| 2011/0231257 A1 | 9/2011 | Winters | |
| 2011/0238538 A1 | 9/2011 | Allison, Jr. et al. | |
| 2012/0101894 A1 | 4/2012 | Sterling et al. | |
| 2012/0296702 A1* | 11/2012 | Fontana | G06Q 30/06 |
| | | | 705/7.35 |
| 2012/0303425 A1 | 11/2012 | Katzin et al. | |
| 2012/0310687 A1 | 12/2012 | Carter | |
| 2012/0323663 A1 | 12/2012 | Leach | |
| 2013/0166398 A1 | 6/2013 | Minde | |
| 2013/0197949 A1 | 8/2013 | Dermer et al. | |
| 2013/0346221 A1 | 12/2013 | Rangachari et al. | |
| 2014/0019211 A1* | 1/2014 | Chen | G06Q 10/0637 |
| | | | 705/7.36 |
| 2014/0149251 A1* | 5/2014 | Stockwell | G06Q 30/0613 |
| | | | 705/26.35 |
| 2014/0164192 A1 | 6/2014 | Brown et al. | |
| 2014/0180767 A1 | 6/2014 | Villars | |
| 2014/0207524 A1 | 7/2014 | Just | |
| 2014/0213300 A1 | 7/2014 | Spears et al. | |
| 2014/0278799 A1 | 9/2014 | McLean | |
| 2014/0279185 A1 | 9/2014 | Merz et al. | |
| 2014/0316888 A1 | 10/2014 | Villars | |
| 2014/0365301 A1 | 12/2014 | Rappoport et al. | |
| 2015/0142785 A1 | 5/2015 | Roberts et al. | |
| 2015/0193784 A1 | 7/2015 | Gao et al. | |
| 2016/0260071 A1* | 9/2016 | Bechakas | G06Q 40/06 |
| 2017/0262748 A1 | 9/2017 | Lettow et al. | |
| 2017/0262784 A1 | 9/2017 | Lowery et al. | |
| 2017/0364836 A1 | 12/2017 | Li | |
| 2018/0365718 A1 | 12/2018 | Sprecher | |
| 2019/0236148 A1 | 8/2019 | DeFelice | |
| 2022/0198544 A1 | 6/2022 | Feng et al. | |

OTHER PUBLICATIONS

Square press release, "Square Completes Sale of Caviar to Doordash", suareup.com (Nov. 1, 2019), pp. 1-4.

Mitchell N. and Wang J., "Using Word2Vec to Power Recommendation Engine", The Corner (Aug. 31, 2017), pp. 1-7.

Li G. and Zhao T., "Restaurant Manu Generation From User Reviews", Stanford University (Jun. 24, 2015), pp. 1-8.

Grbovic M., et al. "Ecommerce in your inbox: product recommendation at scale", Yahoo Labs (Jun. 23, 2016), pp. 1-10.

Non Final Office Action dated Dec. 7, 2020, for U.S. Appl. No. 16/160,564, of Feng, D., et al., filed Oct. 15, 2018.

Brown R.L., "Strategies for Successfully Buying or Selling a Business," The Business Book Press, RDS Associates NC, pp. 222 (2002).

Non-Final Office Action dated Jun. 7, 2017, for U.S. Appl. No. 14/529,687, of Lloyd, L.J., et al., filed Oct. 31, 2014.

Non-Final Office Action dated Jul. 13, 2017, for U.S. Appl. No. 14/529,752, of Lloyd, L.J., et al., filed Oct. 31, 2014.

Final Office Action dated Jan. 10, 2018, for U.S. Appl. No. 14/529,687, of Lloyd, L.J., et al., filed Oct. 31, 2014.

Final Office Action dated Feb. 9, 2018, for U.S. Appl. No. 14/529,752, of Lloyd, L.J., et al., filed Oct. 31, 2014.

Advisory Action dated May 3, 2018, for U.S. Appl. No. 14/529,752, of Lloyd, L.J., et al., filed Oct. 31, 2014.

Non-Final Office Action dated Jul. 13, 2018, for U.S. Appl. No. 14/529,752, of Lloyd, L.J., et al., filed Oct. 31, 2014.

Non-Final Office Action dated Dec. 3, 2018, for U.S. Appl. No. 14/529,687, of Lloyd, L.J., et al., filed Oct. 31, 2014.

Final Office Action dated Feb. 8, 2019, for U.S. Appl. No. 14/529,752, of Lloyd, L.J., et al., filed Oct. 31, 2014.

Non Final Office Action dated Mar. 14, 2019, for U.S. Appl. No. 16/177,068, of Grodin, S., et al., filed Oct. 31, 2018.

Final Office Action dated Jun. 26, 2019, for U.S. Appl. No. 14/529,687, of Lloyd, L.J., et al., filed Oct. 31, 2014.

Final Office Action dated Jun. 26, 2019, for U.S. Appl. No. 16/177,068, of Grodin, S., et al., filed Oct. 31, 2018.

Non Final Office Action dated Sep. 12, 2019, for U.S. Appl. No. 15/789,678, of Cziraky-Stanley, C., et al., filed Oct. 20, 2017.

Advisory Action dated Sep. 16, 2019, for U.S. Appl. No. 14/529,687, of Lloyd, L.J., et al., filed Oct. 31, 2014.

Non Final Office Action dated Nov. 27, 2019, for U.S. Appl. No. 16/177,068, of Grodin, S., et al., filed Oct. 31, 2018.

Final Office Action dated Mar. 9, 2020, for U.S. Appl. No. 15/789,678, of Cziraky-Stanley, C., et al., iled Oct. 20, 2017.

Final Office Action dated Mar. 9, 2020, for U.S. Appl. No. 16/177,068, of Grodin, S., et al., filed Oct. 31, 2018.

Advisory Action dated May 19, 2020, for U.S. Appl. No. 16/177,068, of Grodin, S., et al., filed Oct. 31, 2018.

Advisory Action dated Jun. 15, 2020, for U.S. Appl. No. 15/789,678, of Cziraky-Stanley, C., et al., filed Oct. 20, 2017.

Final Office Action dated May 6, 2021, for U.S. Appl. No. 16/160,564, of Feng, D., et al., filed Oct. 15, 2018.

Corrected Notice of Allowability dated Sep. 16, 2021, for U.S. Appl. No. 16/160,564, of Feng, D., et al., filed Oct. 15, 2018.

Lin et al., "Multi-criteria GIS-based procedure for coffee shop location decision", Akadem for Teknik Och Miljo, (Jun. 2013), pp. 1-47.

Notice of Allowance dated Aug. 20, 2021, for U.S. Appl. No. 16/160,564, of Feng, D., et al., filed Oct. 15, 2018.

Christopher Skeels, "Caviar's Food Recommendation Platform", developer.sqareup.com/blog, dated Jun. 13, 2018 (Year: 2018).

* cited by examiner

800 ⤸

```
┌─────────────────────────────────────────────────────────────────┐
│ RECEIVE, FROM POS TERMINALS, TRANSACTION INFORMATION ASSOCIATED  │
│ WITH TRANSACTIONS BETWEEN MERCHANTS AND CUSTOMERS, A FIRST POS   │
│ TERMINAL COMMUNICATING FIRST TRANSACTION INFORMATION INCLUDING   │
│ AT LEAST ONE OF REVENUE DATA, EXPENSE DATA, CUSTOMER BEHAVIOR    │
│ DATA, OR PROFITABILITY DATA                                      │
│                              802                                 │
└─────────────────────────────────────────────────────────────────┘
                                 ↓
┌─────────────────────────────────────────────────────────────────┐
│  ANALYZE FIRST TRANSACTION INFORMATION TO ESTIMATE EARNINGS      │
│       GROWTH POTENTIAL ASSOCIATED WITH FIRST MERCHANT            │
│                              804                                 │
└─────────────────────────────────────────────────────────────────┘
                                 ↓
┌─────────────────────────────────────────────────────────────────┐
│   DETERMINE CURRENT VALUE OF ASSETS ASSOCIATED WITH FIRST        │
│   MERCHANT BASED AT LEAST IN PART ON EARNINGS GROWTH POTENTIAL   │
│                              806                                 │
└─────────────────────────────────────────────────────────────────┘
                                 ↓
┌─────────────────────────────────────────────────────────────────┐
│ CAUSE DISPLAY OF INDICATION OF FIRST MERCHANT AND SUGGESTED SALE │
│ PRICE FOR ASSETS ON MARKETPLACE PLATFORM, MARKETPLACE PLATFORM   │
│ ENABLING SECOND MERCHANT OPERATING SECOND POS TERMINAL TO (1)    │
│ VIEW AT LEAST PORTION OF AT LEAST ONE OF FIRST TRANSACTION       │
│ INFORMATION OR FUTURE INCOME OR (2) INITIATE PURCHASE OF ASSETS  │
│                              808                                 │
└─────────────────────────────────────────────────────────────────┘
                                 ↓
┌─────────────────────────────────────────────────────────────────┐
│       RECEIVE INDICATION THAT PURCHASE OF ASSETS IS COMPLETE     │
│                              810                                 │
└─────────────────────────────────────────────────────────────────┘
                                 ↓
┌─────────────────────────────────────────────────────────────────┐
│   BASED AT LEAST IN PART ON INDICATION, MERGE AT LEAST PORTION   │
│   OF FIRST TRANSACTION INFORMATION WITH SECOND TRANSACTION       │
│             INFORMATION OF SECOND MERCHANT                       │
│                              812                                 │
└─────────────────────────────────────────────────────────────────┘
```

FIG. 8

ACCOUNT-BASED DATA AND MARKETPLACE GENERATION

RELATED APPLICATION

This application is a continuation of, and claims priority to, U.S. patent application Ser. No. 15/789,678, filed on Oct. 20, 2017, entitled "ACCOUNT-BASED DATA AND MARKETPLACE GENERATION", which is fully incorporated by reference herein.

BACKGROUND

Some business owners desire to sell their business. Some business owners desire to purchase other businesses. A business broker may facilitate the purchase and sale of businesses much like a real estate agent. Described herein are systems that help, among other things, to accurately value a business, generate data for business buyers and sellers to utilize before and during a sale, and effectuate the transfer of data, accounts, and assets from a seller to a buyer of a business.

BRIEF DESCRIPTION OF THE DRAWINGS

The above and other features of the present disclosure, its nature and various advantages, will be more apparent upon consideration of the following detailed description, taken in conjunction with the accompanying drawings in which:

FIG. 8 depicts a non-limiting flow diagram illustrating a process for business valuation and account merger upon completion of a business purchase.

Figure 1:
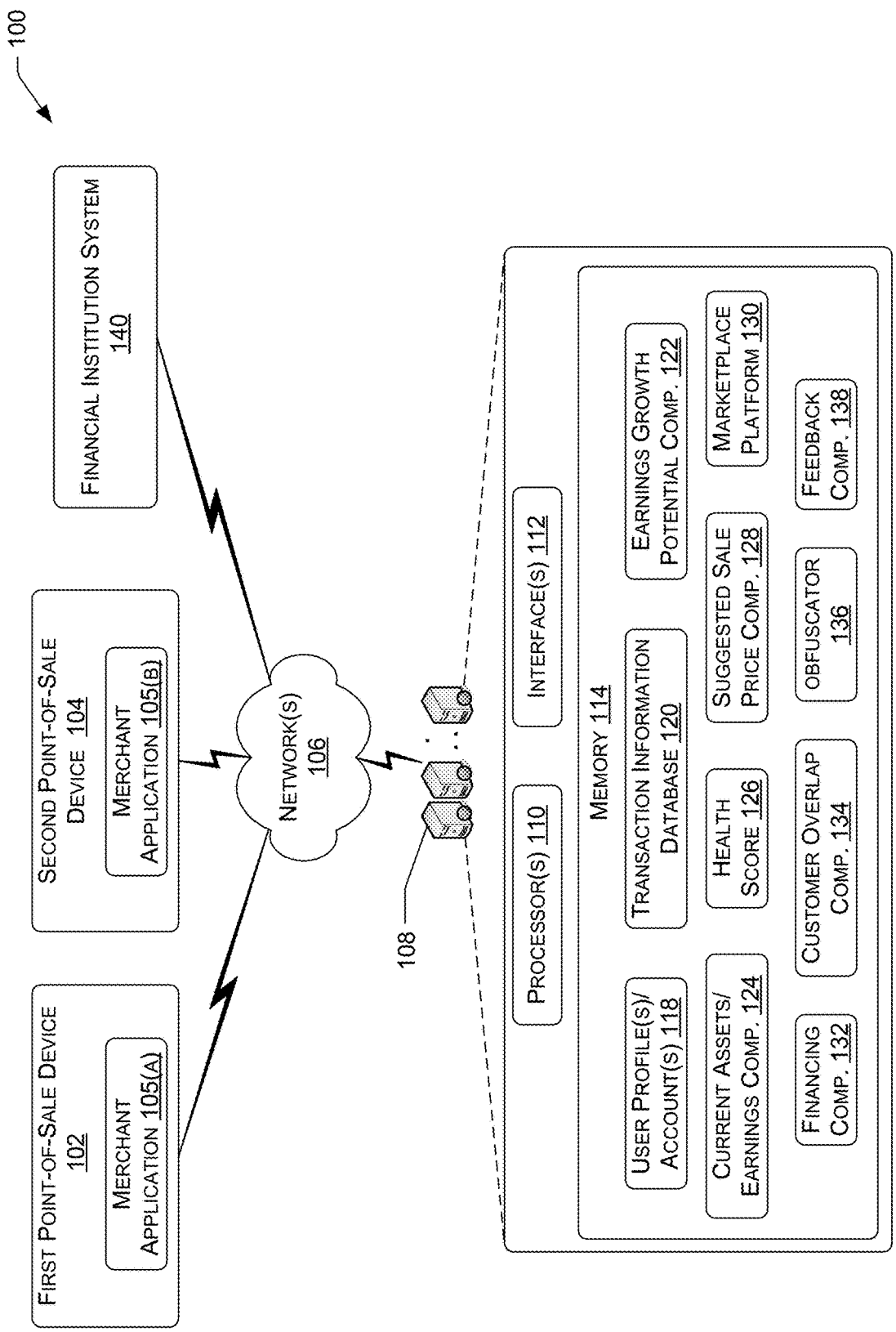
FIG. 1 depicts an example environment for account-based data and marketplace generation.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The techniques and systems described herein are directed to account-based data and marketplace generation. Take, for example, a first merchant and a second merchant, both of which are registered and have accounts with a remote system, such as a payment processing system. The first merchant and/or the second merchant may engage in the sale of goods and/or services using one or more point-of-sale (POS) devices located, for example, at the merchants' places of business. The POS devices may be configured to receive payment information from one or more payment objects, such as credit cards and/or debit cards, when customers purchase goods and/or services. The payment information may be transmitted to the remote system to, for example, facilitate the approval or declination of the payment object to complete a transaction. Additional information may be received by the remote system from the POS devices, such as inventory information, employee management information, invoice information, payroll information, appointment and/or scheduling information, capital history information, cash information, customer directory information, coupon utilization information, expense information, and/or tax information, for example.

The remote system may store all or some of the information described above for the first merchant, the second merchant, and one or more additional merchants that utilize the remote system for payment processing. This information, or a portion thereof, may be utilized to generate transaction information associated with a given merchant. The transaction information may include, for example, an earnings-growth-potential estimation associated with the merchant, a current-assets-and-earnings determination associated with the merchant, a health score associated with the merchant, and/or a customer overlap determination, for example. This transaction information may be utilized to determine a suggested sale price associated with the assets of the merchant. The suggested sale price along with, in examples, all or a portion of the other transaction information may be utilized for presentation to potential buyers.

A marketplace platform may be generated that may allow for display of the transaction information, or a portion thereof, for merchants looking to sell their business and/or for buyers looking to purchase a business, whether or not that business is listed for sale. The marketplace platform may display a number of businesses and a summary of at least some of the transaction information to provide the potential buyer with an overview of the business. The marketplace platform may be configured to allow the potential buyer to select one or more of the businesses for display of additional information, such as time-dependent changes to some or all of the transaction information, customer reviews, customer behavior data, customer comparison data, revenue data, expense data, and/or profitability data. The marketplace platform may also allow a potential buyer to initiate a purchase of a selected business and/or to request that a purchase of the selected business be initiated.

During the purchasing process, transaction information associated with the selling merchant may be merged with transaction information associated with the buying merchant. Additionally, or alternatively, accounts and/or account information associated with the selling merchant may be merged with accounts and/or account information associated with the buying merchant. The sale of the business may cause at least a portion of the combined transaction information to change. User profile information may also be merged such that POS devices associated with a selling merchant may be associated with the buying merchant.

Additionally, or alternatively, in examples, the buying merchant may request or need financing to purchase a particular business. For example, the selling merchant and the buying merchant may agree to a sale price of $100,000 for selling the merchant's business. However, the buying merchant may not have $100,000 to provide to the selling merchant upon closing of the sale. In these and other examples, a remote system may be configured to finance the sale between the selling merchant and the buying merchant. For example, the remote system may be configured to transfer funds from an account associated with the remote system to an account associated with the selling merchant. The transfer of funds from the remote system to the selling merchant may satisfy at least a portion of the closing requirements for the sale of the selling merchant's business. The remote system may be further configured to receive funds from the buying merchant over time, for example, from sales made using the buying merchant's POS devices. For example, the remote system may set a repayment schedule for repayment of the sale price. The repayment schedule may be based at least in part on the transaction information associated with the selling merchant and/or the buying merchant. By way of example, the remote system may determine that a percentage of each sale made by the buying merchant using the POS devices will be transferred to an account of the remote system in partial repayment of the sale price. Transferring of the determined percentage of funds may continue until the sale price is repaid. Any interest agreed upon between the buying merchant and the remote system may be added to the sale price and repaid on the repayment schedule generated by the remote system.

The techniques described herein affect computer operations in various ways. For example, utilizing transaction information acquired from multiple POS devices provides a more accurate valuation of one or more businesses that utilize the POS devices. Additionally, generation of a marketplace platform provides a secure, computer-centric means to search for and select a business for sale. Additionally, merging of account and transaction information upon conclusion of a sale of a business results in additional, meaningful data generation while saving computer resources by at least freeing storage space. Additionally, the transfer of funds in a capital-investment situation and the subsequent transfer of repayment funds over time using specific POS devices associated with the buying merchant provides a unique, computer-centric environment for the transfer of business assets and financing of the same.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

The terms "component" or "module" refer broadly to software stored on non-transitory storage medium (e.g., volatile or non-volatile memory for a computing device), hardware, or firmware (or any combination thereof) modules. Components and/or modules are typically functional such that they that may generate useful data or other output using specified input(s). A component and/or module may or may not be self-contained. An application program (also called an "application") may include one or more components and/or modules, or a component and/or module may include one or more application programs.

The preceding introduction is provided for the purpose of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 depicts an example environment 100 for account-based data and marketplace generation. The environment 100 may include a first point-of-sale (POS) 102 device associated with a first merchant and a second POS device 104 associated with a second merchant. It should be appreciated that more than two POS devices may be associated with the environment 100 and/or each merchant may be associated with more than one POS device. The POS devices 102 and 104 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a set-top box, a computer system in an automobile, an appliance, a robot, a hologram system, a projector, an automated teller machine (ATM), and/or combinations thereof.

In examples, the POS devices 102 and 104 may include one or more processing units, memory, and one or more network interfaces. In examples, the processing unit(s) may execute one or more modules and/or processes to cause the POS devices 102 and 104 to perform a variety of functions, as set forth above and explained in further detail in the following disclosure. In some examples, the processing unit(s) may include a central processing unit (CPU), a graphics processing unit (GPU), both CPU and GPU, or other processing units or components known in the art. Additionally, each of the processing unit(s) may possess its own local memory, which also may store program modules, program data, and/or one or more operating systems. Depending on the exact configuration and type of the POS devices 102 and 104, the memory, also described herein as computer-readable media, may include volatile memory (such as RAM), non-volatile memory (such as ROM, flash memory, miniature hard drive, memory card, or the like), or some combination thereof.

The memory (as well as all other types of memory or storage described herein) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer storage media does not include communication media, such as modulated data signals and carrier waves. As such, computer storage media is non-transitory media.

In various examples, the POS devices 102 and 104 may include one or more input/output interface(s). Examples of input/output interface(s) may include one or more cameras, one or more speakers, one or more microphones, a keyboard, a mouse, a pen, a touch input device, a display, etc. Furthermore, the POS devices 102 and 104 may include one or more network interfaces for interfacing with a network(s) 106, as described below. The network interfaces may be any network interface hardware components that may allow the POS devices 102 and 104 to communicate over the network(s) 106. The one or more networks 106 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 106 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network, the environment selected, or both. Consequently, one or more computing devices of the environment 100 may communicatively couple to the one or more networks 106 in any manner, such as by a wired or wireless connection.

In at least one example, the memory of the POS devices 102 and 104 may include one or more modules or instructions to enable the POS devices 102 and 104 to determine whether background processes or modules are operating on the POS devices 102 and 104. The one or more modules or instructions may be implemented as more processes or as fewer processes, and functions described for the processes may be redistributed depending on the details of the implementation. The terms "module" and "component" refer broadly to software stored on non-transitory storage medium (e.g., volatile or non-volatile memory for a computing device), hardware, or firmware (or any combination thereof) modules. Modules and components are typically functional such that they that may generate useful data or other output using specified input(s). A module and/or component may or may not be self-contained. An application program (also called an "application") may include one or more modules and/or components, or a module and/or a component may include one or more application programs. In some examples, a module and/or component may include an Application Program Interface (API) to perform some or all of its functionality (e.g., operations). In additional and/or alternative examples, the module(s) and/or component(s) may be implemented as computer-readable instructions, various data structures, and so forth via at least one processing unit (e.g., processing unit(s) 108) to configure the POS devices 102 and 104 to execute instructions and to perform operations described herein.

In some examples, the memory may include various components, including an instance of a merchant application 105(a) and 105(b), which may configure the POS devices 102 and 104, also described herein as merchant computing devices, to operate as point-of-sale devices that may accept payment for the sale of goods and/or services. The memory of the POS devices 102 and 104 may also include one or more components that cause the processor(s) of the POS devices 102 and 104 to send information from the POS devices 102 and 104 to a remote system 108 over the one or more networks 106, and to receive information from the remote system 108.

The remote system 108 may include some of the same or similar components as the POS device 102 and/or 104. For example, the remote system 108 may include one or more processors 110 and one or more network interfaces 112. The processors 110 may include similar components as the processors from the POS devices 102 and 104. Additionally, or alternatively, the network interfaces 112 may include similar components as the network interfaces from the POS devices 102 and 104. The remote system 108 may also include memory 114. The memory 114 may include similar components as the memory from the POS devices 102 and 104. Additionally, or alternatively, the memory 114 may include one or more of a user profile/account component 118, a transaction information database 120, an earnings growth potential component 122, a current assets/earnings component 124, a health score component 126, a suggested sale price component 128, a marketplace platform component 130, a financing component 132, a customer overlap component 134, an obfuscator 136, and a feedback component 138, for example. Additional components and/or instructions that, when executed by the one or more processors 110, cause the one or more processors 110 to perform certain operations may be stored in the memory 114, as described elsewhere herein. Example functionality of the components depicted in FIG. 1 is described below.

The user profile/account component 118 may be configured to store information about user profiles and/or user accounts associated with merchants and/or merchant computing devices. For example, a merchant may be registered with the remote system 108 and may provide identifying information about the merchant and/or the merchant's business to the remote system 108. This information may include contact information, the name of the merchant and/or the merchant's business, one or more addresses associated with the merchant, websites associated with the merchant, and/or categories and/or items of goods and/or services offered by the merchant, for example.

The user profile/account component 118 may also store information indicating one or more merchant computing devices, such as POS devices, associated with the merchant and/or the merchant's business. The user profile/account component 118 may additionally, or alternatively, include information about one or more accounts associated with the merchant and/or the merchant's business. The one or more accounts may allow for storage of information associated with revenue, expenses, and/or profitability, for example. It should be noted that a given merchant may be associated with one or more than one user profile and/or a given merchant and/or a given user profile may be associated with one or more than one user account. Associations between merchants, user profiles, user accounts, and transaction information associated therewith may be identified, determined, generated, and/or stored by the user profile/account component 118. The user profile/account component 118 may include information indicating a type of business that a merchant is engaged in. For example, the merchant may frequently sell coffee beans, cups of coffee, and tea. This information may be utilized to determine that the merchant, in this example, is engaged in a coffee selling type of business. Additionally, or alternatively, the user profile/account component 118 may include a geographic location indicator associated with the merchant, the geographic location indicator showing the location of the merchant and/or a POS device and, in examples, associating the merchant and/or the POS device with other merchants and/or POS devices within a geographic region of the location.

The transaction information database 120 may be configured to store transaction information associated with merchants and/or POS devices associated with merchants. The transaction information may include, for example, for a given transaction, the payment object identifier associated with the payment object used during the transaction, the monetary amount of the transaction, the good and/or services sold with respect to the transaction, the name or a naming indicator of the customer, customer information such as contact information, a financial account associated with the payment object and/or the customer, a day and/or time of the transaction, a location where the transaction occurred, loyalty program participation with respect to the transaction, a tip associated with the transaction, and/or a POS device that accepted payment in connection with the transaction. The transaction information may additionally, or alternatively, include charge-back and/or refund data for previously-purchased goods and/or services.

The transaction information may additionally, or alternatively, include inventory information, which may indicate an amount of goods and/or services available with respect to the merchant and/or a POS device. The inventory information may additionally, or alternatively, include information indicating how inventory may change after goods and/or services are purchased. The inventory information may additionally, or alternatively, include information indicating a frequency at which goods and/or services are sold, costs associated with goods and/or services in inventory, and/or locations of goods and/or services in inventory, for example.

The transaction information may additionally, or alternatively, include invoice information, which may include information found on invoices, such as, for example, item quantities, item costs, item descriptions, customer name and contact information, terms of sale, taxes, total amount due, invoice numbers, and/or purchase order numbers. The transaction information may additionally, or alternatively, include employee management information, which may include information indicating a number of employees associated with a particular merchant and/or a POS device, names and/or naming indicators of the employees, work schedules, number of hours worked and/or to be worked by individual employees and/or for employees collectively, costs associated with employees, tax information associated with employees, length of employee tenure with an employer, and/or scheduling conflict information associated with employees.

The transaction information may additionally, or alternatively, include payroll information, which may include information indicating monetary amounts paid out to employees and/or to be paid out to employees. The payroll information may be organized and/or categorized based at least in part on employee scheduling, paycheck dates, fiscal year calendars, and/or quarterly calendars, for example. The transaction information may additionally, or alternatively, include appointment information, which may include information indicating scheduling associated with the merchant. For example, a merchant may have a scheduling system that may indicate when appointments are scheduled and/or when tasks are to be completed.

The transaction information may additionally, or alternatively, include capital history, which may include information indicating the amount of capital associated with a business at a given time and/or over a period of time, such as a month, a quarter, a year, and/or over the existence of the business. The capital history information may additionally, in examples, include financing information indicating financing that the business has obtained and/or the terms of such financing. One or more credit scores associated with individuals identified as owners of the business may also be included in the capital history information. The transaction information may additionally, or alternatively, include intellectual property ownership information, which may identify intellectual property assets associated with the business, such as, for example, patents, trademarks, copyrights, trade secrets, and/or other non-physical assets.

The transaction information may additionally, or alternatively, include customer behavior data, which may include, for example, customer loyalty information, a number of customers that have completed a transaction with a merchant, a number of returning customers, customer satisfaction data, customer loyalty-program participation data, and coupon utilization data.

The transaction information may additionally include revenue data for one or more merchants. The revenue data may be determined from the transaction information associated with payments accepted by the POS device. For example, monetary amounts associated with payments accepted by the POS device may be aggregated for a period of time to determine the amount of money acquired by the merchant over that period of time. The transaction information may additionally include expense data for one or more merchants. The expense data may be determined from the transaction information associated with expenses associated with the merchant and/or the POS device. The expenses may include the cost of goods and/or services sold by the merchant as well as operating costs. The operating costs may be marginalized such that, for a given transaction, a portion of the operating costs is attributed to that transaction. Expense data may be organized over a period of time, which may be the same or a different period of time that revenue data is organized, as described above. The transaction information may additionally include profitability data, which may indicate an amount of profit associated with the merchant and/or a POS device over a period of time. The profitability data may be determined by subtracting the expense data from the revenue data for the period of time. The profitability data may additionally take into account factors other than revenue and expenses that may positively or negatively impact profitability.

It should be noted that while several examples are provided above for the types of transaction information that may be stored in the transaction information database 120, other information associated with merchants, customers, transactions between merchants and customers, associations between customers, associations between merchants, and/or payment processing systems may be included in the transaction information.

The earnings growth potential component 122 may be configured to determine an earnings growth potential associated with a merchant at a given time. The determination of the earnings growth potential may be based at least in part on some or all of the transaction information. For example, a trend in profitability data over time may be utilized to model potential growth or decline of a business. By way of example, if a merchant has a profitability of $20,000 in its first year of business and that profitability increases by an average of $5,000 year over year for 4 years, the earnings growth potential component 122 may utilize this information to determine an earnings growth potential of $45,000 in the sixth year of business. Other transaction information may be utilized to inform the determination of the earnings growth potential, such as capital history information, which may indicate that financing obligations will terminate in the near future.

The current assets/earnings component 124 may be configured to determine a current value of assets and/or earnings associated with a merchant at a given time. For example, the current value of assets may indicate the total monetary value of assets currently possessed by the business. The current value of earnings may indicate the total monetary earnings for the business over a span of time, such as a year. The current value of assets and/or earnings may be determined based at least in part on the earnings growth potential determined by the earnings growth potential component 122, along with other transaction information, such as capital history information, inventory information, customer behavior information, and/or employee management and payroll information. Trends in revenue, expense, and/or profitability may also inform the determination of the current assets/earnings value. The customer behavior information and at least a portion of the intellectual property information may inform a goodwill estimation associated with a merchant. The goodwill estimation may inform the determination of the current assets/earnings value.

The health score component 126 may be configured to determine a health score associated with a merchant. The health score may be associated with a scale, which may allow for quantification of the health score. By way of illustration, the health score may be a score from 0 to 100, with 0 being the worst health score indicative of an unhealthy business and 100 being the best health score indicative of a healthy or financially-stable business. The health score may be determined based at least in part on some or all of the transaction information. For example, increased profitability over a period of time may increase the health score, while decreased profitability over the period of time may decrease the health score. Decreased expenses over a period of time may increase the health score, while increased expenses over a period of time may decrease the health score. An increase in the number of new customer may increase the health score, while a decrease in the number of new customers may decrease the health score. An increase in repeat customers may increase the health score, while a decrease in repeat customers may decrease the health score. Increased participation in customer loyalty programs may increase the health score, while decreased participation in customer loyalty programs may decrease the health score. Favorable customer reviews may increase the health score, while unfavorable customer review may decrease the health score. Increased employee retention may increase the health score, while decreased employee retention may decrease the health score. Decreased financing obligations may increase the health score, while increased financing obligations may decrease the health score. It should be understood that the examples provided with respect to determination of the health score are illustrative and are not the exclusive influencers of the health score. Any factor that positively affects a business may increase the health score, while any factor that negatively affects a business may decrease the health score.

The transaction information utilized to determine a health score of a business may be partially or completely weighted. For example, information associated with profitability may be more heavily weighted than information associated with employee retention. The weighting of transaction information may be static such that certain transaction information is consistently weighted more heavily than other transaction information, and/or the weighting of transaction information may be dynamic and may depend, for example, on the type of business associated with the merchant and/or POS device and/or on a geographic region associated with the merchant and/or the POS device.

Additionally, or alternatively, the health score component 126 may associate an earnings multiplier with the current assets/earnings value based at least in part on the health score. For example, when a business is sold, the sale price may be based at least in part on the current assets/earnings value of the business multiplied by an earnings multiplier. The earnings multiplier may be based at least in part on the type of business being sold. Additionally, or alternatively, the earnings multiplier may be based at least in part on at least one of a level of manager involvement in the business, recession vulnerability associated with the business and/or the type of business, an age of the business, a size of the business, and/or market multiplier standards, for example. In examples, the transaction information described herein, whether for a specific business or for multiple businesses of the same or a similar type, may be utilized to determine the recession vulnerability associated with a particular business. In further examples, the transaction information described herein may be utilized to determine the level of manager involvement in the business. By way of example, a highly-involved manager may indicate that a buying merchant may also need to be highly involved in the day-to-day management of the business, once purchased from the selling merchant. This information may decrease the earnings multiplier in situations where manager involvement is not desirable. Additionally, or alternatively, a high level of manager involvement may indicate that goodwill associated with the business is at least in part associated with the particular manager interfacing with customers and/or running the business. In these examples, the earnings multiplier may be decreased given that the sale of the business will result in that manager no longer being with the acquired business. Customer behavior data may be utilized to determine, at least in part, the level of manager involvement and/or the amount of goodwill attributable to the manager.

Additionally, or alternatively, the earnings multiplier may be based at least in part on the health score. For example, a high health score may be associated with a large earnings multiplier, while a low health score may be associated with a small earnings multiplier. By way of illustration, for a health score range of 0 to 100, a health score of 100 to 95 may be associated with an earnings multiplier of 5, a health score of 94 to 90 may be associated with an earnings multiplier of 4.5, a health score of 89-80 may be associated with an earnings multiplier of 4, a health score of 79-70 may be associated with an earnings multiplier of 3.5, a health score of 69-60 may be associated with an earnings multiplier of 3, a health score of 59-50 may be associated with an earnings multiplier of 2.5, a health score of 49-40 may be associated with an earnings multiplier of 2, a health score of 39-30 may be associated with an earnings multiplier of 1.5, a health score of 29-may be associated with an earnings multiplier of 1, a health score of 19-10 may be associated with an earnings multiplier of 0.5, and a health score of 9-0 may be associated with an earnings multiplier of 0.25. It should be understood that the assignment of an earnings multiplier to a health score or range of health scores, as provided herein, is by way of illustration only and any earnings multiplier may be assigned to any health score or range of health scores. Additionally, or alternatively, the amount of customer overlap between a selling merchant and a buying merchant may influence the earnings multiplier.

The suggested sale price component 128 may be configured to determine a suggested sale price for the business and/or assets associated with the business. The suggested sale price may be determined based at least in part on the current assets/earnings value determined by the current assets/earnings component 124 and the earnings multiplier determined by the health score component 126. Other transaction information from the transaction information database 120 may also influence determination of the suggested sale price. Additionally, or alternatively, the suggested sales price may be based at least in part on projected growth of businesses of a comparable business type to the business in question. Additionally, or alternatively, the suggested sales price may be based at least in part on projected growth of businesses located within a certain geographic area of the business in question. Additionally, or alternatively, the suggested sales price may be based at least in part on one or more lifetime value calculations associate with the business and/or customers that have entered into transactions with the business.

The memory 114 may also include a marketplace platform 130, which may provide merchants with a digital marketplace to search for, list, find, buy, and/or sell businesses and/or assets. Additional details associated with the marketplace platform 130 are described below with respect to FIGS. 2-4. Generally, the marketplace platform 130 may provide a visual indication, such as through a graphical user interface, of one or more merchants and/or POS devices associated with the remote system 108 and at least a portion of the information described above with respect to the transaction information database 120, the earnings growth potential component 122, the current assets/earnings component 124, the health score component 126, and/or the suggested sale price component 128. The marketplace platform 130 may allow a potential buyer to find businesses for potential purchase as well as information about those businesses to make a more informed decision on which businesses to pursue. The marketplace platform 130 described herein may be searched by a potential buyer, such as by keyword searching, business name searching, suggested sale price searching, health score searching, geographic area searching, and/or customer overlap searching.

Before, during, or after a buying merchant and a selling merchant have agreed to enter into a sale agreement, the financing component 132 of the memory 114 may be configured to assess, approve or decline, and/or provide financing to the buying merchant. For example, while the buying merchant and the selling merchant may have agreed to the terms of a sale agreement, the buying merchant may not have enough capital to pay the selling merchant the sale price. In these examples, the financing component 132 may be configured to assess information associated with the buying merchant and/or the selling merchant to determine whether to approve financing for the buying merchant. If approved, the financing component 132 may be configured to transfer funds from an account associated with the remote system 108 to an account associated with the selling merchant. The financing component 132 may be further configured to determine a repayment schedule for the buying merchant to repay the financing. The repayment schedule may be based at least in part on the transaction information associated with the selling merchant and/or the buying merchant. By way of example, the remote system 108 may determine that a percentage of each sale made by the buying merchant using the POS devices will be transferred to an account of the remote system 108 in partial repayment of the sale price. Transferring of the determined percentage of funds may continue until the sale price is repaid. Any interest agreed upon between the buying merchant and the remote system 108 may be added to the sale price and repaid on the repayment schedule generated by the remote system 108.

In other examples, the remote system 108 may purchase a business and/or business assets directly from the selling merchant. Thereafter, the remote system 108 may attempt to sell the business and/or the business assets to a buying merchant. In other examples, the remote system 108 may engage in franchising of the selling business, acquiring a security interest in the selling business and/or assets thereof, and/or facilitating a third-party financing entity to finance the sale of the business and/or the assets thereof.

A customer overlap component 134 of the memory 114 may be configured to determine an amount of similarity and/or dissimilarity between customers of two or more businesses. For example, a buying merchant may desire to know whether the customers of a selling business are largely the same as or different from the customers of the buying merchant. In examples, a buying merchant looking to acquire a competitor may be interested in businesses with a high degree of customer overlap. In other examples, a buying merchant looking to diversify its customer base may be interested in businesses with a low degree of customer overlap. The customer overlap component 134 may utilize transaction information associated with payment object identifiers used by customers to determine an amount of overlap between a buying merchant and a selling merchant.

By way of example, the customer overlap component 134 may determine that 100 payment objects were used to conduct transactions with a first merchant. The customer overlap component 134 may also determine that 30 payment objects used to conduct transactions with a second merchant match those payment objects used to conduct transaction with the first merchant. This customer overlap may be presented to the buying merchant, such as by way of numerical quantity of overlap, percentage of buying merchant and/or selling merchant customers that overlap, or other presentation means. The customer overlap component 134 may also be configured to determine a value of the overlapping customers, with the value being based at least in part on customer behavior information associated with the overlapping customers.

The memory 114 may additionally include an obfuscator component 136, which may be configured to obfuscate transaction information, current assets/earnings information, health score information, and/or suggested sale price information. For example, the marketplace platform 130 may be configured to present merchant information for a potential buyer even when one or more merchants have not offered their business and/or assets for sale. By way of further example, a buying merchant may desire to view detailed transaction information that a selling merchant would only want presented without connection to the identification of the selling merchant. In these examples, the obfuscator component 136 may be configured to remove and/or obscure identifying information associated with one or more merchants while maintaining the various types of information described elsewhere herein. A buying merchant may select one of the obfuscated merchant indicators to begin the process of identifying the merchant for the purpose of initiating a sale agreement with that merchant. In this way, merchants that were not looking to sell their business and/or assets may receive informed offers from potential buyers to determine if a sale is desirable. The presentation of some or all of the transaction information, whether obfuscated or not, is dependent on receiving authorization for presentation of such information from the merchant in question.

The memory 114 may additionally include a feedback component 138. The feedback component 138 may be configured to analyze at least one of the transaction information, earnings growth potential, current assets/earnings, and/or health score to determine one or more actions that the merchant may take to increase the suggested sale price. These actions may be presented to the merchant, such as via the marketplace platform 130. The feedback component 138 may additionally include an indication of how much the suggested price may increase if a given action is taken. In this way, the merchant may be able to prioritize suggested actions to increase the suggested sale price of the merchant's business.

The environment 100 may additionally include a financial institution system 140. The financial institution system 140 may communicate with one or more of the first POS device 102, the second POS device 104, and/or the remote system 108 via the network 106. The financial institution system 140 may store and/or access financial information associated with one or more merchants. The remote system 108 may request and receive the financial information available to the financial institution system 140 to inform the determination of the earnings growth potential, the current assets and/or earnings value, the health score, and/or the suggested sale price of a merchant. The information available to the financial institution system 140 may additionally, or alternatively, be used by the financing component 132 when determining whether to offer financing to a buying merchant.

Figure 2:
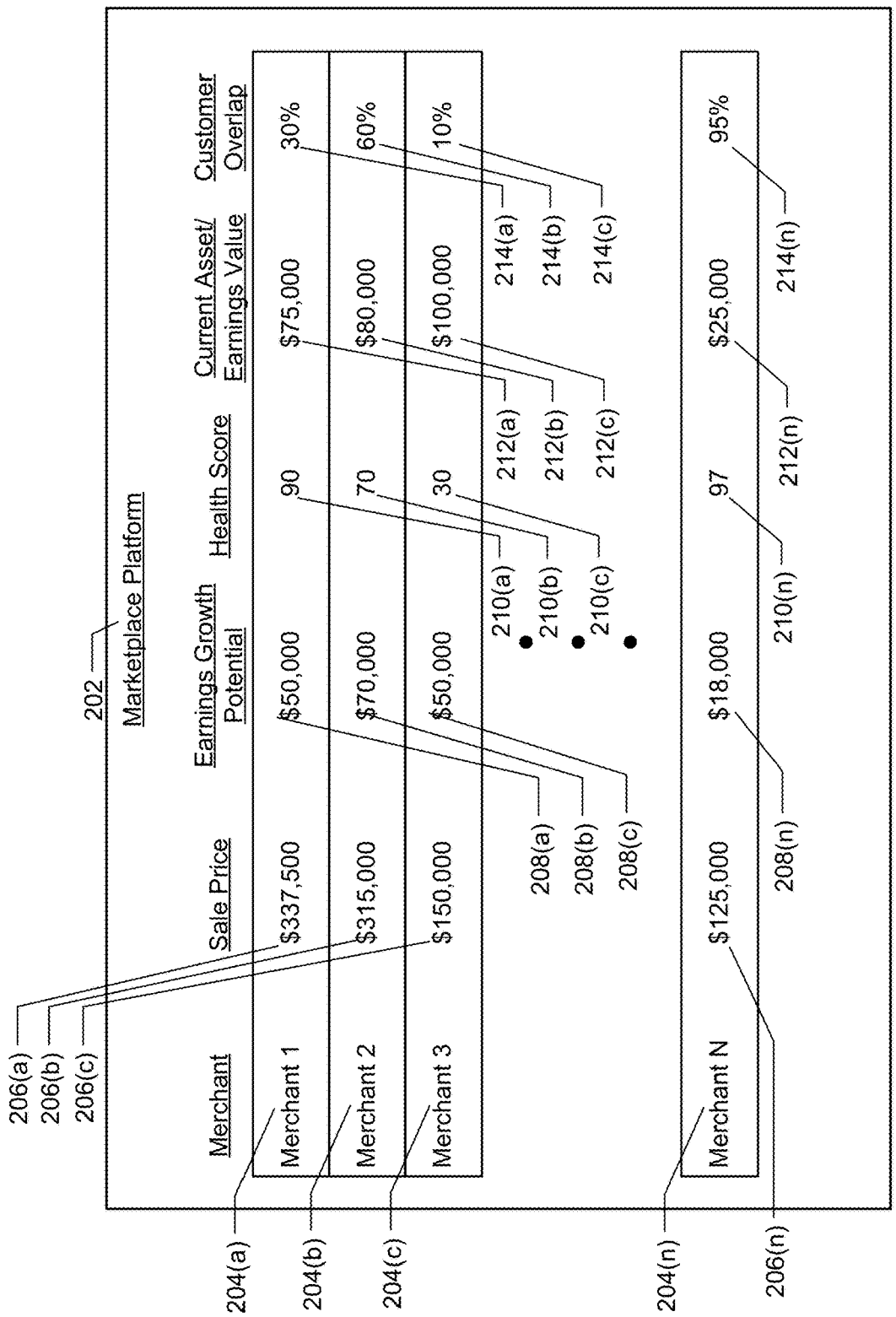
FIG. 2 depicts an example user interface of a marketplace platform displayed, for example, on a point-of-sale (POS) device.

FIG. 2 depicts an example user interface 200 displaying a marketplace platform 202, for example, on a point-of-sale (POS) device. The marketplace platform 202 may have the same or similar components to the marketplace platform 130 described with respect to FIG. 1, above. For example, the marketplace platform 202 may include information regarding one or more merchants and business and/or transaction information associated with the one or more merchants. For example, the marketplace platform 202 may include merchant indicators 204(a)-(n).

The merchant indicators 204(a)-(n) may identify merchants that are associated with a payment processing system, such as the remote system 108 from FIG. 1. The identified merchants may include merchants that have listed their businesses for sale and/or who have expressed an intent to sell their businesses. Additionally, or alternatively, the merchant indicators 204(a)-(n), or a portion thereof, may correspond to a generic merchant identifier, such as "Merchant 1," "Merchant 2," and so on. The use of a generic merchant identifier to identify a given merchant may be utilized, for example, when the seller merchant and/or the buyer merchant desires the merchant identities to be kept anonymous. For example, a seller merchant may not desire to advertise that its business is for sale, but instead may desire to elicit offers to purchase the business without publicly displaying that intent. By way of further example, a buyer merchant may desire to view transaction information that may not be available when the merchant is identified. By viewing merchant indicators 204(a)-(n) as anonymous indicators of merchant identity, and when permitted by the seller merchant, the buyer merchant may be permitted to see some or all of the transaction information that would not be viewable in connection with the identity of the seller merchant.

The marketplace platform 202 may additionally include sale price indicators 206(a)-(n), which may provide an indication of the suggested sale price associated with the business and/or assets of the merchants listed in the marketplace platform 202. The suggested sale price may be determined, for example, by the suggested sale price component 128 of the remote system 108, which is described above with respect to FIG. 1. For example, the suggested sale price component may be configured to determine a suggested sale price for the business and/or assets associated with the business. The suggested sale price may be determined based at least in part on the current assets/earnings value determined by a current assets/earnings component and an earnings multiplier determined by a health score component, described in more detail elsewhere herein. Other transaction information may also influence determination of the suggested sale price. The sale price indicators 206(a)-(n) may provide an indication of whether the suggested sale price is a firm price to which negotiation is not welcome or an offer price to which negotiation is welcome.

The marketplace platform 202 may additionally include earnings growth potential indicators 208(a)-(n), which may provide an indication of the earnings growth potential associated with the businesses of the merchants listed in the marketplace platform 202. The earnings growth potential may be determined, for example, by the earnings growth potential component 122 of the remote system 108, which is described above with respect to FIG. 1. For example, the earnings growth potential component may be configured to determine an earnings growth potential associated with a merchant at a given time. The determination of the earnings growth potential may be based at least in part on some or all of the transaction information. For example, a trend in profitability data over time may be utilized to model potential growth or decline of a business. Other transaction information may be utilized to inform the determination of the earnings growth potential, such as capital history information, which may indicate that financing obligations will terminate in the near future.

The marketplace platform 202 may additionally include health score indicators 210(a)-(n), which may provide an indication of the health score associated with the businesses of the merchants listed in the marketplace platform 202. The health score may be determined, for example, by the health score component 126 of the remote system 108, which is described above with respect to FIG. 1. For example, the health score may be associated with a scale, which may allow for quantification of the health score. By way of illustration, the health score may be a score from 0 to 100, with 0 being the worst health score indicative of an unhealthy business and 100 being the best health score indicative of a healthy or financially-stable business. The health score may be determined based at least in part on some or all of the transaction information.

The transaction information utilized to determine a health score of a business may be partially or completely weighted. For example, information associated with profitability may be more heavily weighted than information associated with employee retention. The weighting of transaction information may be static such that certain transaction information is consistently weighted more heavily than other transaction information, and/or the weighting of transaction information may be dynamic and may depend, for example, on the type of business associated with the merchant and/or POS device and/or on a geographic region associated with the merchant and/or the POS device.

Additionally, or alternatively, the health score component may associate an earnings multiplier with the current assets/earnings value based at least in part on the health score. For example, when a business is sold, the sale price may be based at least in part on the current assets/earnings value of the business multiplied by an earnings multiplier. The earnings multiplier may be based at least in part on the type of business being sold. Additionally, or alternatively, the earnings multiplier may be based at least in part on the health score. For example, a high health score may be associated with a large earnings multiplier, while a low health score may be associated with a small earnings multiplier. It should be understood that the assignment of an earnings multiplier to a health score or range of health scores, as provided herein, is by way of illustration only and any earnings multiplier may be assigned to any health score or range of health scores.

The marketplace platform 202 may additionally include current assets/earnings value indicators 212(a)-(n), which may provide an indication of the current assets/earnings value associated with the businesses of the merchants listed in the marketplace platform 202. The current assets/earnings value may be determined, for example, by the current assets/earnings component 124 of the remote system 108, which is described above with respect to FIG. 1. For example, the current assets/earnings value may be determined based at least in part on the earnings growth potential determined by the earnings growth potential component, along with other transaction information, such as capital history information, inventory information, customer behavior information, and/or employee management and payroll information. Trends in revenue, expense, and/or profitability may also inform the determination of the current assets/earnings value. The customer behavior information and at least a portion of the intellectual property information may inform a goodwill estimation associated with a merchant. The goodwill estimation may inform the determination of the current assets/earnings value.

The marketplace platform 202 may additionally include customer overlap indicators 214(a)-(n), which may provide an indication of the customer overlap between a potential buyer and the merchants listed in the marketplace platform 202. The customer overlap may be determined, for example, by the customer overlap component 134 of the remote system 108, which is described above with respect to FIG. 1. For example, the customer overlap component may be configured to determine an amount of similarity and/or dissimilarity between customers of two or more businesses. The customer overlap component may utilize transaction information associated with payment object identifiers used by customers to determine an amount of overlap between a buying merchant and a selling merchant.

By way of example, the customer overlap component may determine that 30 payment objects used to conduct transactions with a second merchant match those payment objects used to conduct transaction with a first merchant. This customer overlap may be presented to the buying merchant, such as by way of numerical quantity of overlap, percentage of buying merchant and/or selling merchant customers that overlap, or other presentation means. The customer overlap component may also be configured to determine a value of the overlapping customers, with the value being based at least in part on customer behavior information associated with the overlapping customers.

An example of "Merchant 1" from FIG. 2 is provided below to illustrate the various components of an example marketplace platform 202. The merchant indicator 204(a) may provide an indication of the name or other identifying information associated with Merchant 1. The earnings growth potential indicator 208(a) may provide an indication that an estimated earnings growth potential for the business for a given period of time, such as one year, for example, is $50,000. The current assets/earnings value indicator 212(a) may provide an indication that the estimated value of the business at the time that the potential buyer is viewing the marketplace platform 202 is $75,000. The health score indicator 210(a) may provide an indication that the health score for the business at the time that the potential buyer is viewing the marketplace platform 202 is 90, or 90 out of a possible 100. This health score may be considered a high health score. The health score may be associated with an earnings multiplier by which the current assets/earnings value is associated with to determine a suggested sale price. In the example of Merchant 1, the health score may correspond to an earnings multiplier of 4.5. As such, the suggested sale price may be $337,500, which is the current assets/earnings value ($75,000) multiplied by the earnings multiplier (4.5). The suggested sales price may be displayed by the suggested sale price indicator 206(a). Additionally, the customer overlap indicator 214(a) may indicate that there is 30% overlap between the potential buyer viewing the marketplace platform 202 and Merchant 1.

Figure 3:
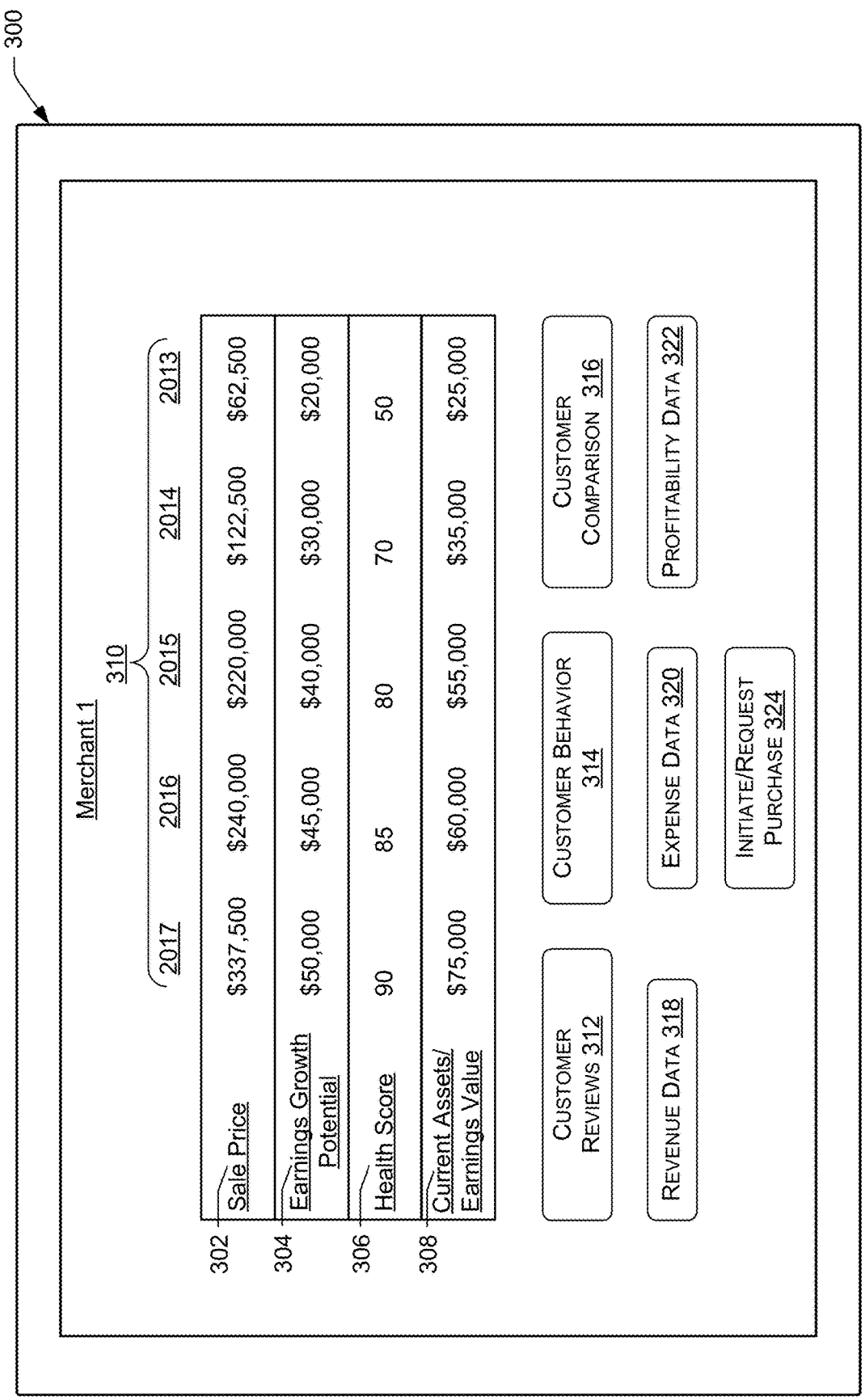
FIG. 3 depicts an example user interface of a merchant account from a potential buyer's perspective on a marketplace platform.

FIG. 3 depicts an example user interface 300 of a merchant account from a potential buyer's perspective on a marketplace platform. The user interface 300 may be presented to a potential buyer when, for example, the potential buyer selects one of the merchant indicators 204(a)-(n) displayed with respect to the marketplace platform 202 from FIG. 2. In the example depicted in FIG. 3, the potential buyer has selected "Merchant 1" and the user interface 300 is configured to present some or all of the information presented with respect to "Merchant 1" from FIG. 2. For example, information such as suggested sale prices 302, earnings growth potentials 304, health scores 306, and/or current assets/earnings values 308 may be presented on the user interface 300.

The user interface 300 may additionally, or alternatively, present some or all of the information described above over a period of time and that information may be categorized and/or organized temporally. For example, as shown in FIG. 3, the presented information may be organized by year, such as 2017, 2016, 2015, etc., over a span of time 310, such as from 2017 to 2013. The year-based organization is depicted in FIG. 3 by way of example. Other amounts of time, such as by month, by week, and/or by quarter, for example, are included herein. The five-year span of time 310 depicted in FIG. 3 is provided by way of example. Other spans of time are included in this disclosure. By presenting the information over the span of time 310, a potential buyer may be able to ascertain the financial wellbeing of the business over the span of time 310. For example, as shown in FIG. 3, Merchant 1 has had increasing current assets/earnings values 308, health scores 306, earnings growth potential 304, and suggested sales prices 302 from 2013 to 2017. While not depicted in FIG. 3, another merchant may have decreased scores and amounts over time, or periods of increase and decrease, or stagnant scores and amounts over time. This information may be important to a potential buyer of the selling merchant's business and/or assets.

FIG. 3 may also include functionality that may allow the potential buyer to view information in addition to, or other than, the suggested sale price 302, the earnings growth potential 304, the health score 306, and/or the current assets/earnings value 308. For example, one or more selectable elements corresponding to customer reviews 312, customer behavior 314, customer comparison 316, revenue data 318, expense data 320, and/or profitability data 322 may be presented to the potential buyer. Upon selection of at least one of these elements, information corresponding thereto may be presented to the potential buyer.

For example, selection of the customer reviews element 312 may cause one or more customer reviews to be presented to the potential buyer via the user interface 300. The customer reviews may include one or more scores and/or ratings of the merchant provided by customers. The customer reviews may additionally, or alternatively, include one or more narrative reviews of the merchant and/or the goods and/or services sold by the merchant. The presentation of customer reviews may provide additional insight to the potential buyer on the health of the merchant's business.

Selection of the customer behavior element 314 may cause customer behavior data to be presented to the potential buyer via the user interface 300. The customer behavior data may include, for example, customer loyalty information, a number of customers that have completed a transaction with the merchant, a number of returning customers, customer satisfaction data, customer loyalty-program participation data, and/or coupon utilization data.

Selection of the customer comparison element 316 may cause customer comparison data, also described herein as customer overlap data, to be presented to the potential buyer via the user interface 300. The customer comparison data may include, for example, an amount of similarity and/or dissimilarity between customers of the selected merchant and the potential buyer. For example, the potential buyer may desire to know whether the customers of the merchant are largely the same as or different from the customers of potential buyer. In examples, a potential buyer looking to acquire a competitor may be interested in businesses with a high degree of customer overlap. In other examples, a potential buyer looking to diversify its customer base may be interested in businesses with a low degree of customer overlap. The customer comparison data may be based at least in part on transaction information associated with payment object identifiers used by customers to determine an amount of overlap between a potential buyer and a selected merchant.

Selection of the revenue data element 318 may cause revenue data to be presented to the potential buyer via the user interface 300. The revenue data may be determined from transaction information associated with payments accepted by one or more POS devices associated with the selected merchant. For example, monetary amounts associated with payments accepted by the POS devices may be aggregated for a period of time to determine the amount of money acquired by the merchant over that period of time. The revenue data may be presented, for example, over a span of time 310.

Selection of the expense data element 320 may cause expense data to be presented to the potential buyer via the user interface 300. The expense data may be determined from the transaction information associated with expenses associated with the selected merchant and/or the POS devices. The expenses may include the cost of goods and/or services sold by the selected merchant as well as operating costs. The operating costs may be marginalized such that, for a given transaction, a portion of the operating costs is attributed to that transaction. Expense data may be organized over a span of time 310, which may be the same or a different span of time 310 that revenue data is organized, as described above.

Selection of the profitability data element 322 may cause profitability data to be presented to the potential buyer via the user interface 300. The profitability data may be determined by subtracting the expense data from the revenue data for the period of time. The profitability data may additionally take into account factors other than revenue and expenses that may positively or negatively impact profitability. Profitability data may be organized over a span of time 310, which may be the same or a different span of time 310 that revenue data and/or expense data is organized, as described above.

The presentation of some or all of the information described above is dependent on receiving authorization for presentation of such information from the merchant in question.

The user interface 300 may additionally include an initiate purchase or request purchase element 324, which may be selectable by the potential buyer. In examples, where the potential buyer desires to initiate a sales agreement with the selected merchant, selection of the initiate purchase element 324 may cause an indication that the potential buyer is interested in initiating a sales agreement with the merchant to be sent to a device associated with the merchant. In examples, the initiate purchase element 324 may be presented on the user interface 300 when the merchant has provided an indication that its business is and/or assets are to be listed for sale. In other examples, the request purchase element 324 may be presented on the user interface 300 when the merchant has not provided an indication that its business is and/or assets are to be listed for sale. In these examples, an indication that a potential buyer is interested in initiating a sales agreement with the merchant may be sent to a device associated with the merchant. In other examples, if a business is struggling, such as when current assets/earnings value is declining and/or when a health score is low and/or declining, the remote system may issue a suggestion to sell the business. If the suggestion is approved by the merchant, the merchant may be listed in the marketplace platform.

A remote system may then facilitate transaction of the sales agreement between the buying merchant and the selling merchant. For example, the remote system may provide documentation, such as contracts, to the buying merchant and the selling merchant. Provision of additional documentation may be based at least in part on receiving an executed non-disclosure agreement from at least one of the buying merchant or the selling merchant. Additionally, or alternatively, upon approval by the selling merchant, the remote system may provide some or all of the transaction information, described in more detail with respect to FIG. 1, to be provided to the buying merchant. Additionally, or alternatively, upon closing of the sales agreement, the remote system may cause transaction information associated with the selling merchant to be merged with transaction information associated with the buying merchant. Additionally, or alternatively, accounts and/or account information associated with the selling merchant may be merged with accounts and/or account information associated with the buying merchant. The sale of the business may cause at least a portion of the combined transaction information to change. User profile information may also be merged such that POS devices associated with a selling merchant may be associated with the buying merchant.

Additionally, or alternatively, in examples, the buying merchant may request or need financing to purchase a particular business. A remote system may be configured to finance the sale between the selling merchant and the buying merchant. For example, the remote system may be configured to transfer funds from an account associated with the remote system to an account associated with the selling merchant. The transfer of funds from the remote system to the selling merchant may satisfy at least a portion of the closing requirements for the sale of the selling merchant's business. The remote system may be further configured to receive funds from the buying merchant over time, for example, from sales made using the buying merchant's POS devices. For example, the remote system may set a repayment schedule for repayment of the sale price. The repayment schedule may be based at least in part on the transaction information associated with the selling merchant and/or the buying merchant. By way of example, the remote system may determine that a percentage of each sale made by the buying merchant using the POS devices will be transferred to an account of the remote system in partial repayment of the sale price. Transferring of the determined percentage of funds may continue until the sale price is repaid. Any interest agreed upon between the buying merchant and the remote system may be added to the sale price and repaid on the repayment schedule generated by the remote system.

By way of example, a merchant financing system may include a financing server and a payment server. The financing server may be implemented as computer programs on one or more computers in one or more locations, in which the systems, components, and techniques described in this specification can be implemented. The payment server may be configured to process financial transactions between the merchant and its customers. These financial transactions can be, for example, card-less payment transactions or transactions performed using financial payment instruments, e.g., credit cards, debit cards, or gift cards, to name some examples.

The financing server may be configured to determine whether a merchant qualifies for a financing offer, e.g., a cash advance, by evaluating various factors associated with the merchant. Some of these factors may be based, in part, on evaluating financial transactions conducted by the merchant through the payment system and/or other transaction information as described herein.

The financing server may determine whether a merchant is eligible for a financing offer, the amount of the cash advance, a fee for the cash advance, e.g., a percentage of the cash advance or a fixed fee, and a rate for repayment for the cash advance and the fee, e.g., a fixed amount or a percentage, to be deducted from financial transactions conducted by the merchant. These determinations may be made, for example, by applying various machine learning techniques, e.g., ensemble learning methods.

In examples, the financing server may utilize a classifier, for example, based on a random forest approach, to determine whether a merchant qualifies for a financing offer. The classifier may be trained using training data that describes, for various merchants, respective payment history, the respective type of business, a respective gross payment volume (GPV) over a particular time period, the growth of the merchant's GPV over a particular time period, e.g., month over month growth, and whether the merchant has a brick-and-mortar store, for example.

To determine whether a particular merchant qualifies for a financing offer, the financing server may utilize the classifier to determine whether factors describing the merchant qualify the merchant for a cash advance. As described above, these factors may be, for example, the merchant's payment history, the type of business, and a GPV over a particular time period, e.g., over the past fiscal quarter or year. The financing server may also determine the amount of the financing offer, the fee for the financing offer, and the rate of repayment, using similar techniques. For example, the financing server may apply normal regression analysis on the merchant's previous financial transactions conducted by the merchant through the payment system to make such determinations. In examples, the fee for the cash advance may be based on a specified percentage, e.g., 14 percent, of the cash advance. In examples, the rate of repayment may be a specified percentage, e.g., 10 percent. In examples, the rate may be determined based at least in part on targeting a 10-month, for example, repayment model. This model may be determined by forecasting the merchant's GPV for the subsequent year.

Once the financing server determines that the merchant qualifies for a financing offer, the details of the financing offer may be sent to the merchant. Depending on the implementation, the offer details may be sent to the computing device over a network, e.g., the Internet, through a web-based environment, as described above, or may be sent to the merchant through electronic communication, e.g., by e-mail or a text message.

The merchant may accept the financing offer. Once the offer is accepted, the financing server may instruct the payment system to disburse funds, to the merchant, in the amount specified in the offer. The payment system may access various merchant data that describes financial account information, e.g., a routing number for a checking account, for the merchant. In examples, the payment system may electronically deposit the funds in the merchant's financial account with a financial institution. The merchant may then access the funds directly from its financial account. Other approaches to providing the merchant with the cash advance are possible including, for example, providing the merchant with a financial payment card having a pre-set spending limit in the amount of the cash advance. In other examples where the financing is in conjunction with the merchant purchasing a business or assets of a business, the payment system may disburse funds to the selling merchant instead of the buying merchant.

In examples, the financing server may determine that the merchant qualifies up to a maximum amount of financing. In these examples, the merchant may request an amount of financing that is the same or less than the maximum amount of financing. In examples, the merchant may request an amount of financing that is higher than the amount of financing that the merchant was pre-qualified to receive. In these examples, the financing server, alone or in combination with human feedback, may evaluate the request to determine whether the merchant should receive the requested higher amount of financing.

The financing server may be configured to evaluate respective factors associated with merchants, as described above, to determine whether any of those merchants pre-qualify for respective financing offers. The factors for each merchant may vary based on the different types of financial transactions performed by that merchant and/or the various attributes of the merchant. Thus, the financing server may generate custom financing offers for each merchant. Financing offers for each merchant may be determined automatically without merchants necessarily requesting such offers. Once determined, these offers may be provided to the merchants, as described above, without the merchant having to request the cash advance.

The payment system may be configured to process financial transactions between the merchant and customers, as described elsewhere herein. In examples, while processing financial transactions for the merchant, the payment system may also be configured to deduct a portion of the merchant's earnings from these financial transactions until the amount of financing provided to the merchant, together with the fee for the financing, is collected by the payment system. As described above, the amount deducted from financial transactions may be based on a rate for repayment for the cash advance and the fee, as specified in the terms and conditions, i.e., a fixed amount deducted from each transaction, e.g., $5, or a percentage, e.g., 10 percent, to be deducted from financial transactions conducted by the merchant. As discussed herein, these deductions may be performed on a per-transaction basis or from financial transactions conducted by the merchant over a certain time period, e.g., hourly, daily, weekly, bi-weekly, monthly, or yearly.

Figure 4:
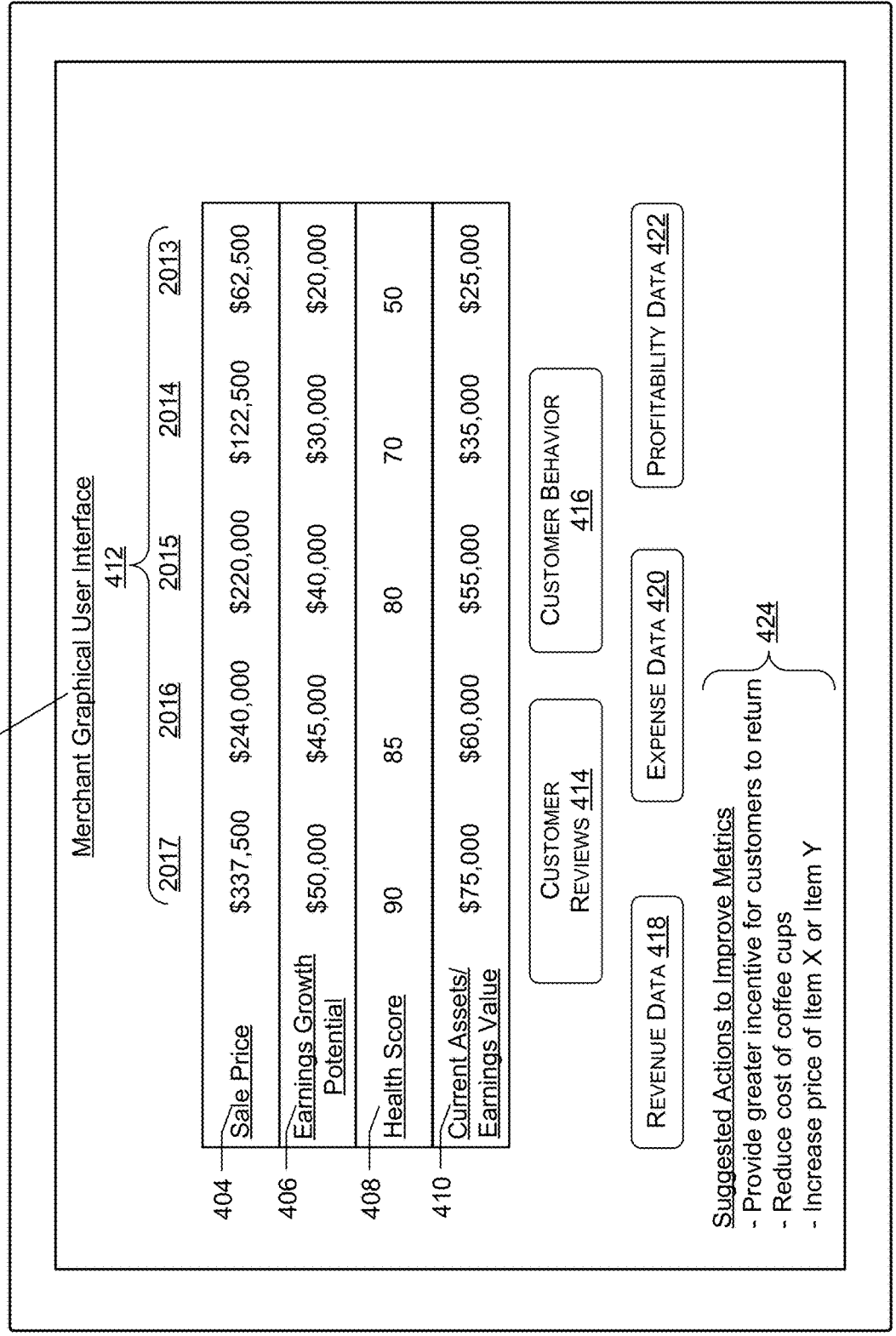
FIG. 4 depicts an example user interface of a merchant account from the merchant's perspective on a marketplace platform.

FIG. 4 depicts an example user interface 400 of a merchant graphical user interface (GUI) 402 for use by a merchant on a marketplace platform. The merchant GUI 402 may include some or all of the features described above with respect to user interface 300. For example, the merchant GUI 402 may display the sales price 404, earnings growth potential 406, health score 408, and/or current assets/earnings value 410 associated with the merchant. This information may be presented over a span of time 412. Additionally, or alternatively, a merchant may select one or more of a customer review element 414, a customer behavior element 416, a revenue data element 418, an expense data element 420, and/or a profitability data element 422. Each of these elements may present the same or similar information as described above with respect to FIG. 3.

Additionally, or alternatively, the merchant GUI 402 may include a feedback section 424. The feedback section 424 may include one or more actions that the merchant may take to increase the suggested sale price. The one or more actions may be based at least in part on analysis of at least one of the transaction information, earnings growth potential, current assets/earnings value, and/or health score. The feedback section 424 may additionally include an indication of how much the suggested price may increase if a given action is taken. In this way, the merchant may be able to prioritize suggested actions to increase the suggested sale price of the merchant's business.

In the examples shown in FIG. 4, the first suggested action is "provide greater incentive for customers to return." This suggested action may have been selected for presentation in the feedback section 424 based at least in part on the customer behavior data indicating that, of the customers that have purchased goods and/or services from the merchant, a percent of those customer that are returning customers is below a threshold percentage. In another example, the second suggested action is "reduce cost of coffee cups." This suggested action may have been selected for presentation in the feedback section 424 based at least in part on expense data indicating that the merchant spends more capital on coffee cups than other expenses and/or aggregated expense data associated with businesses that are similar to the merchant's business type, here coffee shops, indicate that the merchant spends more on coffee cups than competitor coffee shops and/or other merchants in a similar geographic region to the merchant. In another example, the third suggested action is "increase price of Item X or Item Y." This suggested action may have been selected for presentation in the feedback section 424 based at least in part on aggregated transaction information for similar business types and/or businesses within a certain geographic region of the merchant that indicates the same or similar items to Item X and/or Item Y are sold at a higher price by other merchants. It should be noted that the feedback and suggested actions described herein are by way of illustration only, and one or more additional or alternative suggested actions may be presented to the user.

Figure 5:
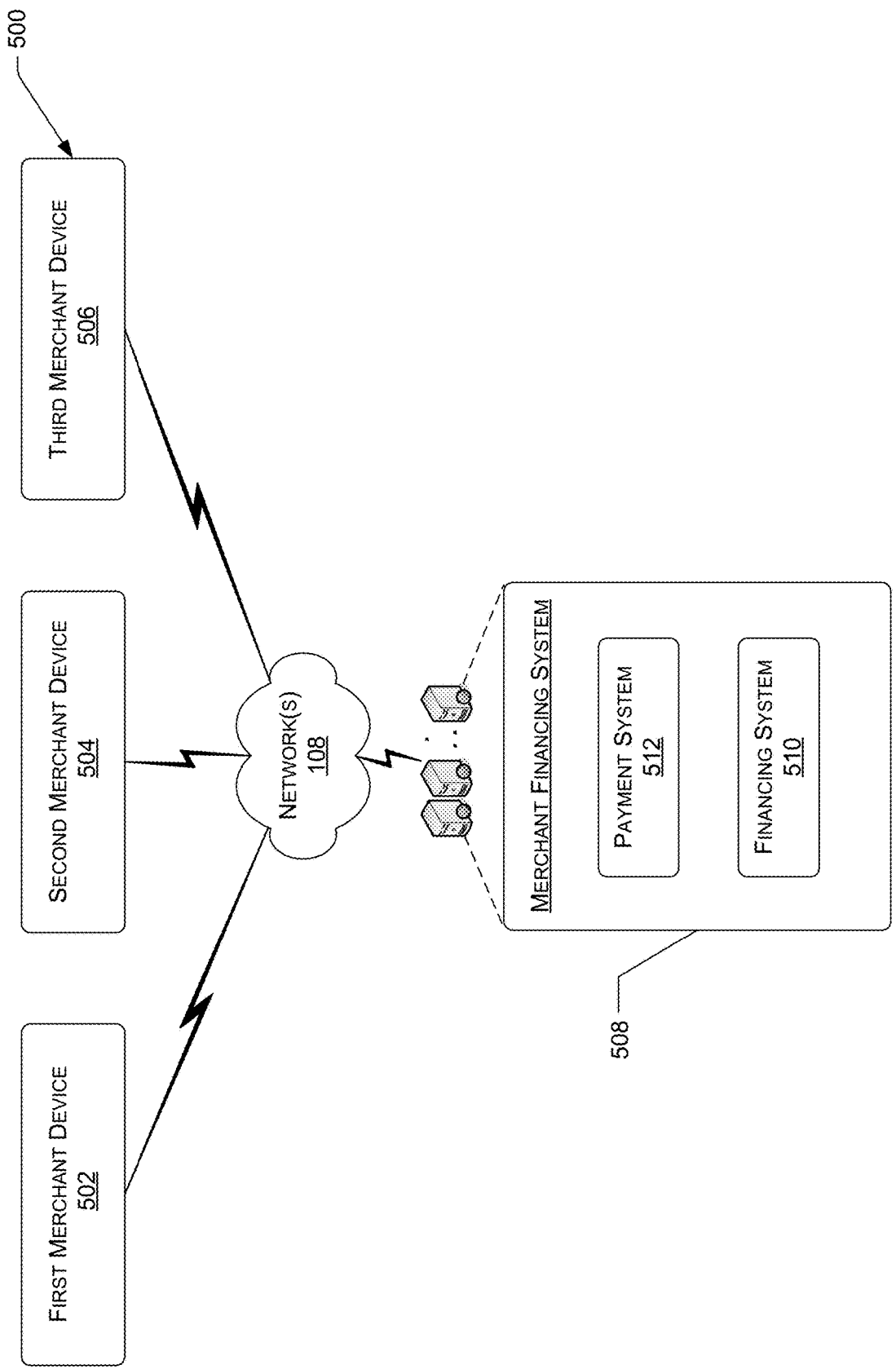
FIG. 5 depicts an example environment for financing of a business purchase.

FIG. 5 depicts an example environment 500 for collecting repayment from multiple merchant devices 502, 504, and 506 associated with a merchant. The exemplary environment 500 may include one or more than one device at one or more business locations. Each merchant device 502, 504, and 506 may be configured to conduct financial transactions through a payment system 512 in a merchant financing system 508. The merchant financing system 508 may include a financing service 510 and the payment system 512. The merchant financing system 508 may be configured to perform the operations of the merchant financing system described with respect to FIG. 3, above. Similarly, the financing server 510 and the payment system 512 may be configured to respectively perform the operations of the financing server and the payment system, as described in reference to FIG. 3.

For example, the merchant financing system 508 may determine whether a merchant is eligible for a financing offer, the amount of the cash advance, a fee for the cash advance, e.g., a percentage of the cash advance or a fixed fee, and a rate for repayment for the cash advance and the fee, i.e., a fixed amount or a percentage, to be deducted from financial transactions conducted by the merchant.

Once the merchant has received the cash advance, the merchant financing system 508 may begin collecting repayment of the cash advance and the fee associated with the cash advance. To collect payment of the cash advance and the fee, the payment system 512 may be configured to process financial transactions conducted by the merchant that received the cash advance through its merchant devices 502, 504, and/or 506. In examples, while processing financial transactions for the merchant, the payment system 512 may also be configured to deduct a portion of the merchant's earnings from these financial transactions until the amount of financing provided to the merchant, together with the fee for the financing, is collected by the payment system 512. As described above, the amount deducted from financial transactions may be based on a rate for repayment for the cash advance and the fee, as specified in the terms and conditions, i.e., a fixed amount deducted from each transaction, e.g., $5, or a percentage, e.g., 10 percent, to be deducted from financial transactions conducted by the merchant. These deductions may be performed on a per-transaction basis or from financial transactions conducted by the merchant over a certain time period, e.g., hourly, daily, weekly, bi-weekly, monthly, or yearly.

In examples, a merchant may have multiple merchant devices 502, 504, and 506 at various business locations. The merchant financing system 508 may be configured to process financial transactions for the merchant that are received from each merchant device 502, 504, and 506 at each business location. The merchant financing system 508 may be configured to collect repayment of a cash advance and fee that the merchant received by deducting a portion of the merchant's earnings from financial transactions conducted by the merchant from each business location. The deduction may be performed based on a rate of repayment, as described above. Further, the merchant financing system 508 may use the same rate of repayment for each of the merchant's business locations. For example, the merchant financing system 508 may deduct 10 percent from financial transactions conducted by the merchant from a first business location associated with the first merchant device 502, 10 percent from financial transactions conducted by the merchant from a second business location associated with the second merchant device 504, and 10 percent from financial transactions conducted by the merchant from a third business location associated with the third merchant device 506.

Based at least in part on customer traffic, each business location may experience different amounts of financial transactions for purchases that were made at that business location. For example, the first business location may make sales that amount to $50,000 for a particular month while the second business location may make $20,000 in sales and the third business location may make $20,000 in sales. To ensure that the merchant repays the cash advance and fee at a certain time, in examples, the merchant financing system 508 may be configured to adjust the rate of repayment for each of the merchant's business locations. For example, the merchant financing system 508 may dynamically restructure the rate of repayment for each business location based on the merchant's respective earnings from financial transactions conducted from those business locations.

For example, assuming the merchant financing system 508 was expecting to collect $14,000 from the merchant during the particular month and, during the particular month, the first business location transacted $50,000 in sales while the second business location transacted $20,000 in sales and the third business location transacted $20,000 in sales. Using the same rate of repayment, e.g., 10 percent, for each business location, the merchant financing system 508 would collect $5,000 from the first business location, $2,000 from the second business location, and $2,000 from the third business location. Thus, the amount collected by the merchant financing system 508 totals $9,000, which is $5,000 short of what the merchant financing system 508 was expected to collect, i.e., $14,000. In this example, to ensure that the full $14,000 amount is able to be collected in the particular month, the merchant financing system 508 may dynamically increase the rate of repayment for the merchant's first business location to 20 percent so that the merchant financing system 508 collects $10,000 from the merchant's earnings that were generated from the first business location. The merchant financing system 508 may dynamically restructure the respective rate of repayment for each of the merchant's business locations on an on-going basis, e.g., daily, weekly, biweekly, monthly, or yearly.

The dynamic restructuring may typically be based on a defined time period for completing the repayment of the cash advance and the fee. For example, the time period for repayment may be 10 months. If the rate of repayment is based on a percentage of the merchant's earnings, then the amount collected from the merchant will vary depending on the number of financial transactions conducted by the merchant and the amounts collected by the merchant through those financial transactions.

In examples, to ensure that the merchant repays the cash advance and fee in the defined time, the merchant financing system 508 may evaluate the merchant's earnings from each of the business locations at certain time periods or intervals, e.g., monthly. If, after the evaluation, the merchant financing system 508 determines that the merchant is not on track to repay the cash advance and fee in the defined time, then the merchant financing system 508 may dynamically increase the respective rates of repayment for the merchant's business locations to ensure that the merchant repays the amount due in the defined time.

If, however, after the evaluation, the merchant financing system 508 determines that the merchant is on track to repay the cash advance and fee before the defined time period ends, then the merchant financing system 508 may dynamically decrease the respective rates of repayment for the merchant's business locations to ensure that the merchant repays the amount due at the defined time. In examples, the merchant financing system 508 may dynamically reduce the merchant's respective rates of repayment when the merchant's collective earnings from all business locations satisfy a threshold net percent value of the cash advance and fee.

In examples, a merchant that is on track to repay the cash advance and fee before the defined time period may want to repay the cash advance and fee sooner than the defined time. In these examples, the merchant may instruct the merchant financing system 508 to continue collecting from the merchant's financial transactions at the existing rates of repayment so that the merchant is able to repay its obligations earlier than the defined time.

In examples, if the merchant financing system 508 determines that the merchant is on track to repay the cash advance and fee before the defined time period ends, the merchant financing system 508 may notify the merchant, for example, by an electronic communication, to request instructions from the merchant on whether the merchant wants to accept early repayment or a dynamic restructuring of the merchant's rates of repayment so that repayment occurs at the defined time.

In examples, the merchant financing system 508 may be configured to dynamically adjust the rates of repayment for a merchant in response to a determination that the merchant has repaid a threshold portion, e.g., 25 percent, of the cash advance and fee. For example, the merchant financing system 508 may dynamically decrease the rates of repayment for the merchant to reward the merchant for repaying the threshold portion of the cash advance and fee.

In examples, the merchant financing system 508 may be configured to provide the merchant with an offer for a new cash advance in response to a determination that the merchant has repaid the owed cash advance and fee. For example, the merchant financing system 508 may offer the merchant a new cash advance of a higher amount than the previous cash advance to reward the merchant for repaying the cash advance and fee.

Figure 6:
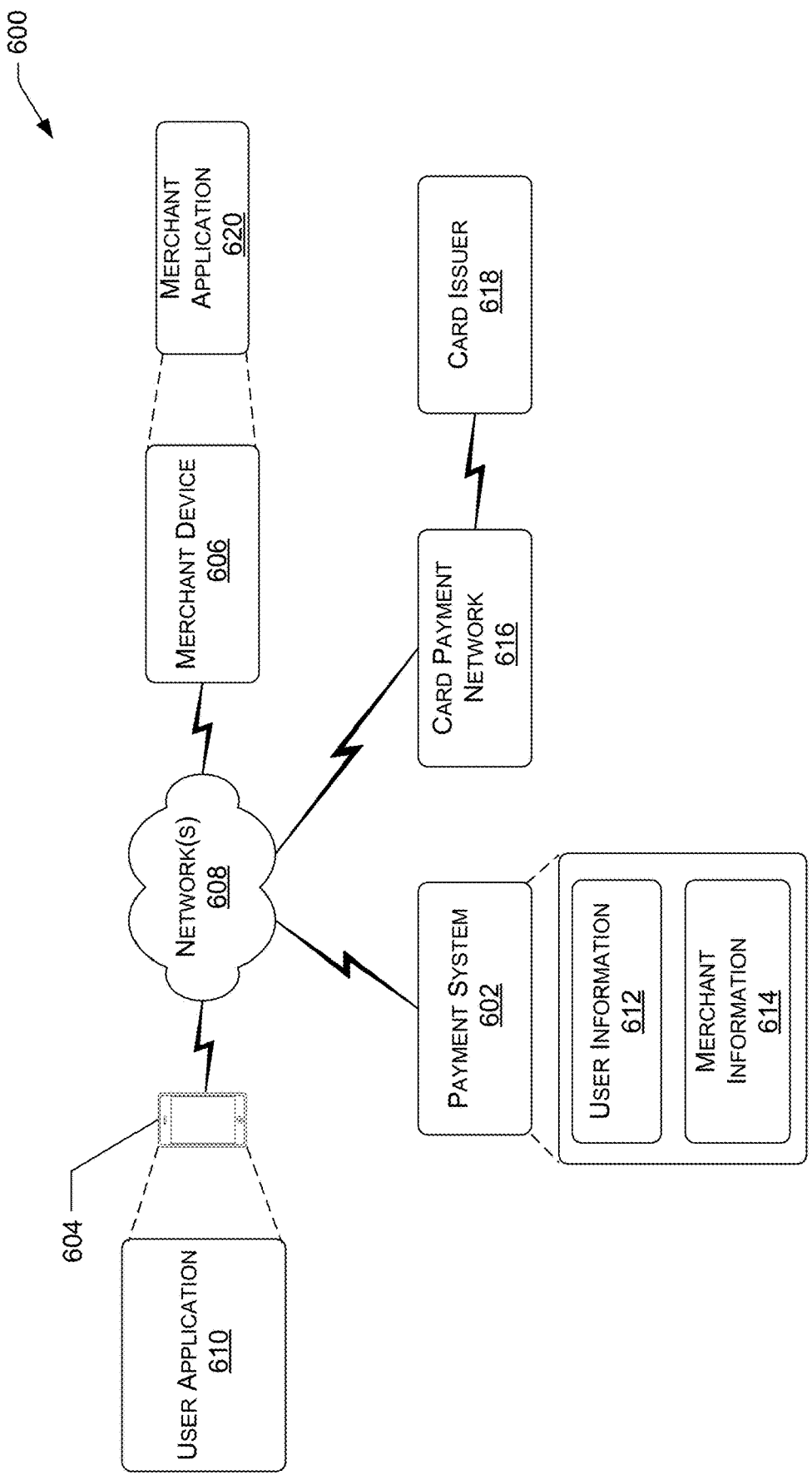
FIG. 6 depicts an example environment for implementing a payment system.

FIG. 6 depicts an example environment 600 for implementing a payment system. Although a mobile device environment is described for purposes of explanation, different environments may be used, e.g., a web-based environment, to implement various embodiments.

The example environment 600 may include a payment system 602, e.g., the payment system from FIG. 3, as described above, which may be implemented as computer programs on one or more computers in one or more locations, in which the systems, components, and techniques described below can be implemented. The example environment 600 may also include a user device 604 and a merchant device 606.

The user device 604 and the merchant device 606 may each be a computer coupled to the payment system 602 through a data communication network 608, e.g., the Internet. The user device 604 and the merchant device 606 each may generally include a memory, e.g., a random access memory (RAM), for storing instructions and data, and a processor for executing stored instructions. The user device 604 and the merchant device 606 may each include one or more components, e.g., software or hardware, that are configured to respectively determine a geographic location of the user device 604 or the merchant device 606, using, for example, various geolocation techniques, e.g., a global positioning system (GPS). Further, the user device 604 and the merchant device 606 may each be any appropriate device operable to send and receive requests, messages, or other types of information over the network 608. Some examples of user devices include personal computers, cellular phones, handheld messaging devices, laptop computers, personal data assistants, tablet devices, and the like.

The network 608 may include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The payment system 602, the merchant device 606, and the user device 604 may communicate over the network 608 using wired or wireless connections, and combinations thereof.

For purposes of illustration, a financial transaction may be described as a transaction that is conducted between a customer and a merchant at a point-of-sale. When paying for a financial transaction, the customer may provide the merchant with cash, a check, or credit card for the amount that is due, for example. The merchant may interact with a point-of-sale device, e.g., merchant device 606, to process the financial transaction. During financial transactions, the point-of-sale device may collect data describing the financial transaction, including, for example, the amount of payment received from customers.

In examples, the payment system 606 is configured to accept card-less payment transactions from customers. A card-less payment transaction may be described as a transaction conducted between the customer and a merchant at the point-of-sale during which a financial account of the customer is charged without the customer having to physically present a financial payment card to the merchant at the point-of-sale. That is, the merchant need not receive any details about the financial account, e.g., the credit card issuer or credit card number, for the transaction to be processed.

Before conducting card-less payment transactions, the customer typically creates a user account with the payment system 602. The customer may create the user account, for example, by interacting with a user application 610 that is configured to perform card-less payment transactions and that is running on the user device 604. When creating a user account with the payment system 602, the customer may provide a portrait of the customer and/or data describing a financial account of the customer, e.g., credit card number, expiration date, and a billing address. This user information may be securely stored by the payment system 602, for example, in a user information database 612. To accept card-less payment transactions, the merchant may create a merchant account with the payment system 602 by providing information describing the merchant including, for example, a merchant name, contact information, e.g., telephone numbers, the merchant's geographic location address, and one or more financial accounts to which funds collected from users will be deposited. This merchant information may be securely stored by the payment system 602, for example, in a merchant information database 614.

The payment system 602 may be configured to perform card-less payment transactions. The payment system 602 may include one or more servers that are configured to securely perform electronic financial transactions, e.g., electronic payment transactions, between a customer and a merchant, for example, through data communicated between the user device 604 and the merchant device 606. When a customer and a merchant enter into an electronic financial transaction, the transaction may be processed by transferring funds from a financial account associated with the user account to a financial account associated with the merchant account.

The payment system 602 may be configured to send and receive data to and from the user device 604 and the merchant device 606. For example, the payment system 602 may be configured to send data describing merchants to the user device 604 using, for example, the information stored in the merchant information database 614. For example, the payment system 602 may communicate data describing merchants that are within a threshold geographic distance from a geographic location of the user device 604, as described herein. The data describing merchants may include, for example, a merchant name, geographic location, contact information, and/or an electronic catalogue, e.g., a menu, that describes items that are available for purchase from the merchant.

In examples, the payment system 602 may be configured to determine whether a geographic location of the user device 604 is within a threshold geographic distance from a geographic location of the merchant device 606. The payment system 602 may determine a geographic location of the user device 604 using, for example, geolocation data provided by the user device 604. Similarly, the payment system 602 may determine a geographic location of the merchant device 604 using, for example, geolocation data provided by the merchant device 606 or using a geographic address, e.g., street address, provided by the merchant. Depending on the implementation, the threshold geographic distance may be specified by the payment system 602 or by the merchant.

Determining whether the user device 604 is within a threshold geographic distance of the merchant device 606 may be accomplished in different ways including, for example, determining whether the user device 604 is within a threshold geographic radius of the merchant device 606, determining whether the user device 604 is within a particular geofence, or determining whether the user device 604 can communicate with the merchant device 606 using a specified wireless technology, e.g., Bluetooth or Bluetooth low energy (BLE). In examples, the payment system 602 may restrict card-less payment transactions between the customer and the merchant to situations where the geographic location of the user device 604 is within a threshold geographic distance from a geographic location of the merchant device 606.

The payment system 602 may also be configured to communicate with a computer system of a card payment network 616, e.g., Visa or MasterCard, over the network 608, or over a different network, for example, to conduct electronic financial transactions. The computer system of the card payment network 616 may communicate with a computer system of a card issuer 618, e.g., a bank. There may be computer systems of other entities, e.g., the card acquirer, between the payment system 602 and the computer system of the card issuer 618.

The customer operating the user device 604 that is within a threshold geographic distance of the merchant device 606 may interact with the user application 610 running on the user device 604 to conduct a card-less payment transaction with the merchant. While interacting with the user application 610, the customer may select the merchant, from a listing of merchants, with whom the customer wants to enter into a card-less payment transaction. The user may select the merchant, for example, by selecting a "check in" option associated with the merchant. The user device 604 may communicate data to the payment system 602 indicating that the customer has checked in with the merchant. In response, the payment system 602 may communicate data to notify the merchant device 606 that the user has checked in. A merchant application 620 running on the merchant device 606 may notify the merchant that the user has electronically checked in with the merchant through a display screen of the merchant device 606.

Once checked in, the customer may collect, or request, items that are available for purchase from the merchant. When the customer is ready to enter into the card-less payment transaction, the customer may, for example, approach a point-of-sale for the merchant and identify him or herself. For example, the customer may verbally notify the merchant that the customer wants to enter into a card-less payment transaction and can provide the merchant with the customer's name. The merchant may then interact with the merchant application 620 to select the customer, from a listing of customers that have checked in with the merchant, to initiate a card-less payment transaction for the items being purchased by the customer. For example, the merchant may determine a total amount to bill the customer for the items being purchased. The customer may verbally approve the total amount to be billed and, in response, the merchant may submit a request for a card-less payment transaction for the total amount to the payment system 602. In response, the payment system 602 may obtain, for example, from the user information database 612, data describing a financial account associated with a user account of the customer to which the total amount will be billed.

The payment system 602 may then communicate with the computer system of the card payment network 616 to complete an electronic financial transaction for the total amount to be billed to the customer's financial account. Once the electronic financial transaction is complete, the payment system 602 may communicate data describing the card-less payment transaction to the user device 604, e.g., an electronic receipt, which can, for example, notify the customer of the total amount billed to the user for the card-less payment transaction with the particular merchant.

This information associated with the payment system 602 and/or the transactions associated with the merchant device 606 may be included in the transaction information described herein with respect to, for example, FIG. 1.

All or some of the techniques, data, and information described above may be utilized for utilizing transaction information acquired from multiple POS devices to provide a more accurate valuation of one or more businesses that utilize the POS devices. Additionally, generation of a marketplace platform provides a secure, computer-centric means to search for and select a business for sale. Additionally, merging of account and transaction information upon conclusion of a sale of a business results in additional, meaningful data generation while saving computer resources by freeing storage space. Additionally, the transfer of funds in a capital-investment situation and the subsequent transfer of repayment funds over time using specific POS devices associated with the buying merchant provides a unique, computer-centric environment for the transfer of business assets and financing of the same.

Figure 7:
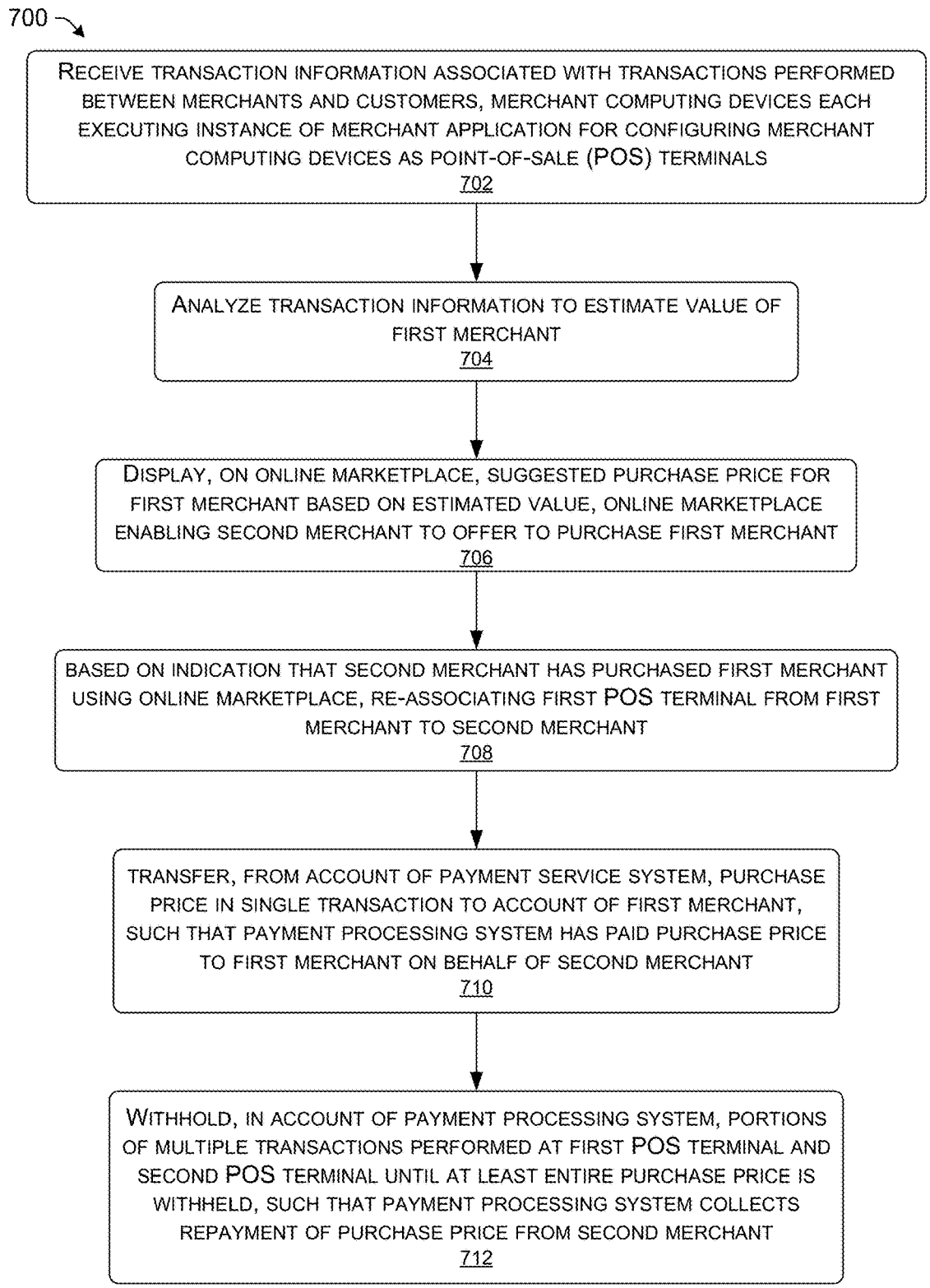
FIG. 7 depicts a non-limiting flow diagram illustrating a process for business valuation and transfer of assets upon completion of a business purchase.
Figure 9:
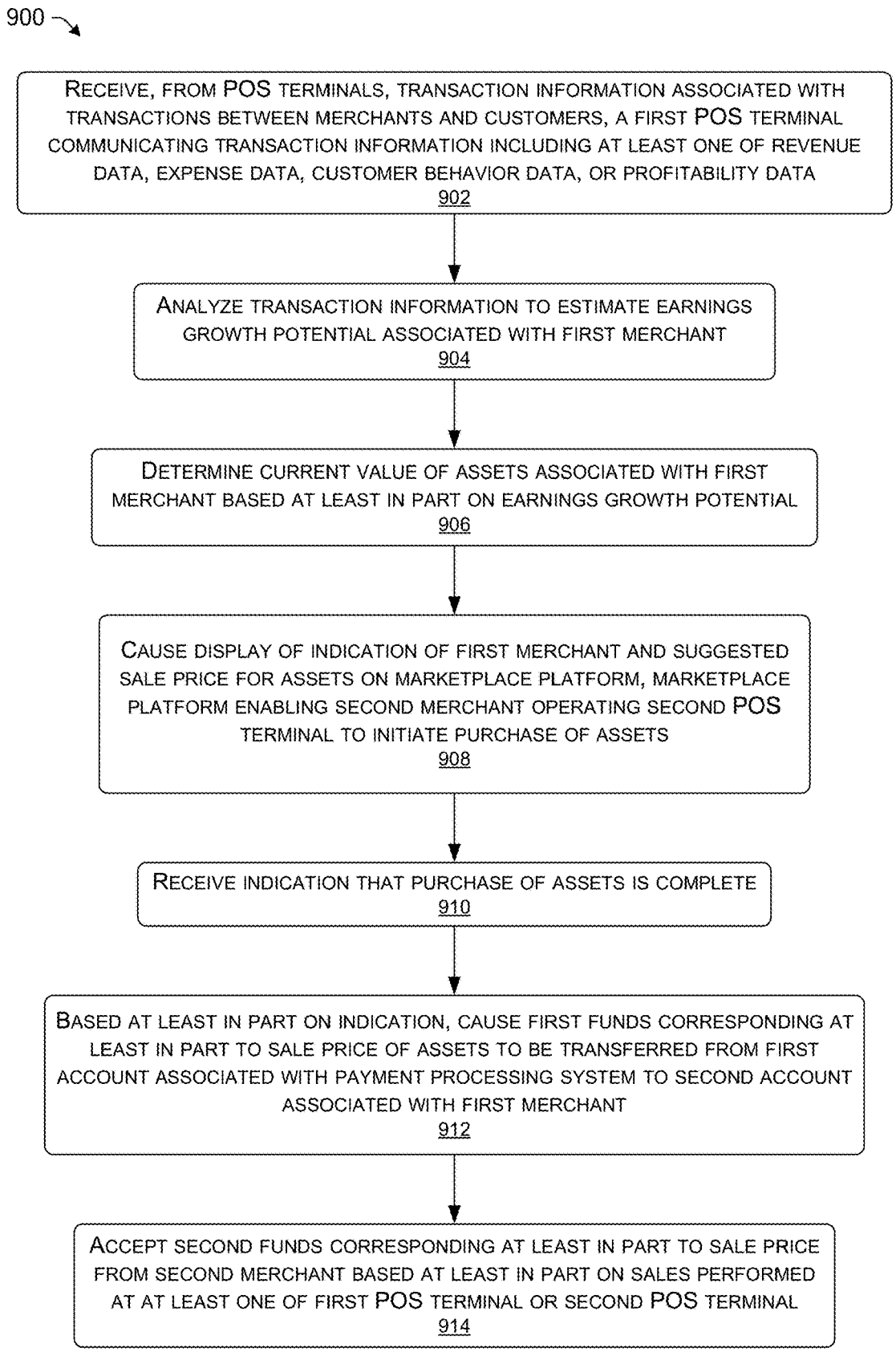
FIG. 9 depicts a non-limiting flow diagram illustrating a process for business valuation and fund transfer involving a payment processing system.

FIGS. 7-9 illustrate various processes for account-based data generation and marketplace platform generation. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, although the processes may be implemented in a wide variety of other environments, architectures and systems.

FIG. 7 depicts a non-limiting flow diagram illustrating a process 700 for business valuation and transfer of assets upon completion of a business purchase.

At block 702, the process 700 may include receiving, at a payment processing system and from merchant computing devices associated with merchants, transaction information associated with transactions performed between the merchants and customers. The merchant computing devices may each execute an instance of a merchant application for configuring the merchant computing devices as point-of-sale (POS) terminals. The POS terminals may include a first POS terminal associated with a first merchant and a second POS terminal associated with a second merchant. The first transaction information may include at least one of revenue data corresponding to revenue associated with the first POS terminal, expense data corresponding to expenses incurred by the first merchant, customer behavior data associated with the customers, or profitability data corresponding to profits associated with the first merchant.

The revenue data may be determined from the transaction information associated with payments accepted by the POS device. For example, monetary amounts associated with payments accepted by the POS device may be aggregated for a period of time to determine the amount of money acquired by the merchant over that period of time. The expense data may be determined from the transaction information associated with expenses associated with the merchant and/or the POS device. The expenses may include the cost of goods and/or services sold by the merchant as well as operating costs. The operating costs may be marginalized such that, for a given transaction, a portion of the operating costs is attributed to that transaction. Expense data may be organized over a period of time, which may be the same or a different period of time that revenue data is organized, as described above. The profitability data may indicate an amount of profit associated with the merchant and/or a POS device over a period of time. The profitability data may be determined by subtracting the expense data from the revenue data for the period of time. The profitability data may additionally take into account factors other than revenue and expenses that may positively or negatively impact profitability. The customer behavior data may include, for example, customer loyalty information, a number of customers that have completed a transaction with a merchant, a number of returning customers, customer satisfaction data, customer loyalty-program participation data, and coupon utilization data.

The transaction information may additionally, or alternatively, include, for example, for a given transaction, the payment object identifier associated with the payment object used during the transaction, the monetary amount of the transaction, the good and/or services sold with respect to the transaction, the name or a naming indicator of the customer, customer information such as contact information, a financial account associated with the payment object and/or the customer, a day and/or time of the transaction, a location where the transaction occurred, loyalty program participation with respect to the transaction, a tip associated with the transaction, and/or a POS device that accepted payment in connection with the transaction. The transaction information may additionally, or alternatively, include charge-back and/ or refund data for previously-purchased goods and/or services.

The transaction information may additionally, or alternatively, include inventory information, which may indicate an amount of goods and/or services available with respect to the merchant and/or a POS device. The inventory information may additionally, or alternatively, include information indicating how inventory may change after goods and/or services are purchased. The inventory information may additionally, or alternatively, include information indicating a frequency at which goods and/or services are sold, costs associated with goods and/or services in inventory, and/or locations of goods and/or services in inventory, for example.

The transaction information may additionally, or alternatively, include invoice information, which may include information found on invoices, such as, for example, item quantities, item costs, item descriptions, customer name and contact information, terms of sale, taxes, total amount due, invoice numbers, and/or purchase order numbers. The transaction information may additionally, or alternatively, include employee management information, which may include information indicating a number of employees associated with a particular merchant and/or a POS device, names and/or naming indicators of the employees, work schedules, number of hours worked and/or to be worked by individual employees and/or for employees collectively, costs associated with employees, tax information associated with employees, length of employee tenure with an employer, and/or scheduling conflict information associated with employees.

The transaction information may additionally, or alternatively, include payroll information, which may include information indicating monetary amounts paid out to employees and/or to be paid out to employees. The payroll information may be organized and/or categorized based at least in part on employee scheduling, paycheck dates, fiscal year calendars, and/or quarterly calendars, for example. The transaction information may additionally, or alternatively, include appointment information, which may include information indicating scheduling associated with the merchant. For example, a merchant may have a scheduling system that may indicate when appointments are scheduled and/or tasks are to be completed.

The transaction information may additionally, or alternatively, include capital history, which may include information indicating the amount of capital associated with a business at a given time and/or over a period of time, such as a month, a quarter, a year, and/or over the existence of the business. The capital history information may additionally, in examples, include financing information indicating financing that the business has obtained and/or the terms of such financing. One or more credit scores associated with individuals identified as owners of the business may also be included in the capital history information. The transaction information may additionally, or alternatively, include intellectual property ownership information, which may identify intellectual property assets associated with the business, such as, for example, patents, trademarks, copyrights, trade secrets, and/or other non-physical assets.

At block 704, the process 700 may include analyzing the transaction information to estimate a value of the first merchant. The value of the first merchant may include an earnings growth potential associated with the first merchant. The determination of the earnings growth potential may be based at least in part on some or all of the transaction information. For example, a trend in profitability data over time may be utilized to model potential growth or decline of a business. By way of example, if a merchant has a profitability of $20,000 in its first year of business and that profitability increases by an average of $5,000 year over year for 4 years, the earnings growth potential component 122 may utilize this information to determine an earnings growth potential of $45,000 in the sixth year of business. Other transaction information may be utilized to inform the determination of the earnings growth potential, such as capital history information, which may indicate that financing obligations will terminate in the near future.

At block 706, the process 700 may include displaying, on an online marketplace, a suggested purchase price for the first merchant based on the estimated value. The online marketplace may enable the second merchant to offer to purchase the first merchant. The suggested sale price may be based at least in part on a current assets/earnings value of assets associated with the first merchant, which may be based at least in part on the earnings growth potential. The current assets/earnings value may be determined based at least in part on the earnings growth potential, along with other transaction information, such as capital history information, inventory information, customer behavior information, and/or employee management and payroll information. Trends in revenue, expense, and/or profitability may also inform the determination of the current assets/earnings value. The customer behavior information and at least a portion of the intellectual property information may inform a goodwill estimation associated with a merchant. The goodwill estimation may inform the determination of the current assets/earnings value.

At block 708, the process 700 may include re-associating the first POS terminal from the first merchant to the second merchant based at least in part on an indication that the second merchant has purchased the first merchant using the online marketplace. An indication of the first merchant and a suggested sale price for the assets may be displayed on the online marketplace, which may be describes as a marketplace platform. The marketplace platform may enable the second merchant operating the second POS terminal to (i) view at least a portion of the first transaction information or the earnings growth potential and (ii) to initiate a purchase of the assets.

The suggested sale price may be determined based at least in part on the current assets/earnings value and an earnings multiplier determined in connection with a health score associated with the first merchant. The health score may be associated with a scale, which may allow for quantification of the health score. By way of illustration, the health score may be a score from 0 to 100, with 0 being the worst health score indicative of an unhealthy business and 100 being the best health score indicative of a healthy or financially-stable business. The health score may be determined based at least in part on some or all of the transaction information. For example, increased profitability over a period of time may increase the health score, while decreased profitability over the period of time may decrease the health score. Decreased expenses over a period of time may increase the health score, while increased expenses over a period of time may decrease the health score. An increase in the number of new customer may increase the health score, while a decrease in the number of new customers may decrease the health score. An increase in repeat customers may increase the health score, while a decrease in repeat customers may decrease the health score. Increased participation in customer loyalty programs may increase the health score, while decreased participation in customer loyalty programs may decrease the health score. Favorable customer reviews may increase the health score, while unfavorable customer review may decrease the health score. Increased employee retention may increase the health score, while decreased employee retention may decrease the health score. Decreased financing obligations may increase the health score, while increased financing obligations may decrease the health score. It should be understood that the examples provided with respect to determination of the health score are illustrative and are not the exclusive influencers of the health score. Any factor that positively affects a business may increase the health score, while any factor that negatively affects a business may decrease the health score.

The transaction information utilized to determine a health score of a business may be partially or completely weighted. For example, information associated with profitability may be more heavily weighted than information associated with employee retention. The weighting of transaction information may be static such that certain transaction information is consistently weighted more heavily than other transaction information, and/or the weighting of transaction information may be dynamic and may depend, for example, on the type of business associated with the merchant and/or POS device and/or on a geographic region associated with the merchant and/or the POS device. Other transaction information from the transaction information database may also influence determination of the suggested sale price.

The marketplace platform may provide merchants with a digital marketplace to search for, list, find, buy, and/or sell businesses and/or assets. Additional details associated with the marketplace platform are described with respect to FIGS. 2-4. Generally, the marketplace platform may provide a visual indication, such as through a graphical user interface, of one or more merchants and/or POS devices associated with the remote system and at least a portion of the information described above with respect to the transaction information. The marketplace platform may allow a potential buyer to find businesses for potential purchase as well as information about those businesses to make a more informed decision on which businesses to pursue.

At block 710, the process 700 may include transferring, from an account of a payment service system, the purchase price in a single transaction to an account of the first merchant, such that the payment processing system has paid the purchase price to the first merchant on behalf of the second merchant. The transferring may be based at least in part on receiving an indication that the purchase of the assets is complete. Alternatively, the indication may comprise an indication that the first merchant and the second merchant have initiated purchase of the assets, have agreed to terms on the purchase of the assets, or at any other point during negotiations.

For example, while the first merchant and the second merchant may have agreed to the terms of a sale agreement, the second merchant may not have enough capital to pay the first merchant the sale price. In these examples, the remote system may be configured to assess information associated with the second merchant and/or the first merchant to determine whether to approve financing for the second merchant. If approved, the remote system may be configured to transfer funds from an account associated with the remote system to an account associated with the first merchant.

The process 700 may also include merging at least a portion of the first transaction information with second transaction information of the second merchant. The merging may be based at least in part on the purchase of the assets being completed. Transaction information associated with the selling merchant may be merged with transaction information associated with the buying merchant. The sale of the business may cause at least a portion of the combined transaction information to change. User profile information may also be merged such that POS devices associated with a selling merchant may be associated with the buying merchant.

At block 716, the process 700 may include withholding, in the account of the payment processing system, portions of multiple transactions performed at the first POS terminal and/or the second POS terminal until at least the entire purchase price is withheld, such that the payment processing system collects repayment of the purchase price from the second merchant. The remote system may be configured to determine a repayment schedule for the second merchant to repay the financing. The repayment schedule may be based at least in part on the transaction information associated with the first merchant and/or the second merchant. By way of example, the remote system may determine that a percentage of each sale made by the second merchant using the POS devices will be transferred to an account of the remote system in partial repayment of the sale price. Transferring of the determined percentage of funds may continue until the sale price is repaid. Any interest agreed upon between the second merchant and the remote system may be added to the sale price and repaid on the repayment schedule generated by the remote system.

The process 700 may additionally, or alternatively, include determining that a change in value associated with at least one of the revenue data, the expense data, the customer behavior data, or the profitability data will increase the current assets/earnings value. The process 700 may additionally include generating feedback data indicating one or more actions that will cause the change and causing an indication of the one or more actions to be displayed on the first POS terminal. The remote system may be configured to analyze at least one of the transaction information, earnings growth potential, current assets/earnings value, and/or health score to determine one or more actions that the merchant may take to increase the suggested sale price. These actions may be presented to the merchant, such as via the marketplace platform. The remote system may additionally include an indication of how much the suggested price may increase if a given action is taken. In this way, the merchant may be able to prioritize suggested actions to increase the suggested sale price of the merchant's business.

The process 700 may additionally, or alternatively, include anonymizing, also described herein as obfuscating, at least a portion of the transaction information to generate obfuscated transaction information. The obfuscated transaction information may exclude identifying information associated with the first merchant. The process 700 may additionally include causing display of the obfuscated transaction information on the marketplace platform. For example, the marketplace platform may be configured to present merchant information for a potential buyer even when one or more merchants have not offered their business and/or assets for sale. By way of further example, a buying merchant may desire to view detailed transaction information that a selling merchant would only want presented without connection to the identification of the selling merchant. In these examples, the remote system may be configured to remove and/or obscure identifying information associated with one or more merchants while maintaining the various types of information described elsewhere herein. A buying merchant may select one of the obfuscated merchant indicators to begin the process of identifying the merchant for the purpose of initiating a sale agreement with that merchant. In this way, merchants that were not looking to sell their business and/or assets may receive informed offers from potential buyers to determine if a sale is desirable.

The process 700 may additionally, or alternatively, include determining comparable merchants to the first merchant based at least in part on at least one of (1) a business type associated with the first merchant and respective business types of the comparable merchants or (2) a geographic region associated with the first merchant and respective geographic regions of the comparable merchants. By way of example, a business type may be "coffee shop," "restaurant," "movie theatre," "plumber," "electrician," etc. By way of example, a geographic region may be a certain distance from the first merchant, and/or within a same city as the first merchant, and/or within a same county as the first merchant, and/or within the same state as the first merchant. The process 700 may additionally include aggregating other transaction information associated with the comparable merchants. The determination of current assets/earnings value, described above at block 706, may be based at least in part on the other transaction information.

FIG. 8 depicts a non-limiting flow diagram illustrating a process 800 for business valuation and account merger upon completion of a business purchase.

At block 802, the process 800 may include receiving, from a first merchant computing device associated with a first merchant, first transaction information associated with transactions performed between the first merchant and customers. The first merchant computing device may be at least partly executing a merchant application for configuring the first merchant computing device as a first point-of-sale (POS) terminal that is configured to communicate the first transaction information over a network to a payment processing system. The transaction information may include at least one of revenue data corresponding to revenue associated with the first POS terminal, expense data corresponding to expenses incurred by the first merchant, customer behavior data, or profitability data corresponding to profits associated with the first merchant.

The revenue data may be determined from the transaction information associated with payments accepted by the POS device. For example, monetary amounts associated with payments accepted by the POS device may be aggregated for a period of time to determine the amount of money acquired by the merchant over that period of time. The expense data may be determined from the transaction information associated with expenses associated with the merchant and/or the POS device. The expenses may include the cost of goods and/or services sold by the merchant as well as operating costs. The operating costs may be marginalized such that, for a given transaction, a portion of the operating costs is attributed to that transaction. Expense data may be organized over a period of time, which may be the same or a different period of time that revenue data is organized, as described above. The profitability data may indicate an amount of profit associated with the merchant and/or a POS device over a period of time. The profitability data may be determined by subtracting the expense data from the revenue data for the period of time. The profitability data may additionally take into account factors other than revenue and expenses that may positively or negatively impact profitability. The customer behavior data may include, for example, customer loyalty information, a number of customers that have completed a transaction with a merchant, a number of returning customers, customer satisfaction data, customer loyalty-program participation data, and coupon utilization data.

The transaction information may additionally, or alternatively, include, for example, for a given transaction, the payment object identifier associated with the payment object used during the transaction, the monetary amount of the transaction, the good and/or services sold with respect to the transaction, the name or a naming indicator of the customer, customer information such as contact information, a financial account associated with the payment object and/or the customer, a day and/or time of the transaction, a location where the transaction occurred, loyalty program participation with respect to the transaction, a tip associated with the transaction, and/or a POS device that accepted payment in connection with the transaction. The transaction information may additionally, or alternatively, include charge-back and/or refund data for previously-purchased goods and/or services.

The transaction information may additionally, or alternatively, include inventory information, which may indicate an amount of goods and/or services available with respect to the merchant and/or a POS device. The inventory information may additionally, or alternatively, include information indicating how inventory may change after goods and/or services are purchased. The inventory information may additionally, or alternatively, include information indicating a frequency at which goods and/or services are sold, costs associated with goods and/or services in inventory, and/or locations of goods and/or services in inventory, for example.

The transaction information may additionally, or alternatively, include invoice information, which may include information found on invoices, such as, for example, item quantities, item costs, item descriptions, customer name and contact information, terms of sale, taxes, total amount due, invoice numbers, and/or purchase order numbers. The transaction information may additionally, or alternatively, include employee management information, which may include information indicating a number of employees associated with a particular merchant and/or a POS device, names and/or naming indicators of the employees, work schedules, number of hours worked and/or to be worked by individual employees and/or for employees collectively, costs associated with employees, tax information associated with employees, length of employee tenure with an employer, and/or scheduling conflict information associated with employees.

The transaction information may additionally, or alternatively, include payroll information, which may include information indicating monetary amounts paid out to employees and/or to be paid out to employees. The payroll information may be organized and/or categorized based at least in part on employee scheduling, paycheck dates, fiscal year calendars, and/or quarterly calendars, for example. The transaction information may additionally, or alternatively, include appointment information, which may include information indicating scheduling associated with the merchant. For example, a merchant may have a scheduling system that may indicate when appointments are scheduled and/or tasks are to be completed.

The transaction information may additionally, or alternatively, include capital history, which may include information indicating the amount of capital associated with a business at a given time and/or over a period of time, such as a month, a quarter, a year, and/or over the existence of the business. The capital history information may additionally, in examples, include financing information indicating financing that the business has obtained and/or the terms of such financing. One or more credit scores associated with individuals identified as owners of the business may also be included in the capital history information. The transaction information may additionally, or alternatively, include intellectual property ownership information, which may identify intellectual property assets associated with the business, such as, for example, patents, trademarks, copyrights, trade secrets, and/or other non-physical assets.

At block 804, the process 800 may include analyzing the first transaction information to estimate an earnings growth potential associated with the first merchant. The determination of the earnings growth potential may be based at least in part on some or all of the transaction information. For example, a trend in profitability data over time may be utilized to model potential growth or decline of a business. By way of example, if a merchant has a profitability of $20,000 in its first year of business and that profitability increases by an average of $5,000 year over year for 4 years, the earnings growth potential component 122 may utilize this information to determine an earnings growth potential of $45,000 in the sixth year of business. Other transaction information may be utilized to inform the determination of the earnings growth potential, such as capital history information, which may indicate that financing obligations will terminate in the near future.

At block 806, the process 800 may include determining a current assets/earnings value of assets associated with the first merchant based at least in part on the earnings growth potential. The current assets/earnings value may be determined based at least in part on the earnings growth potential, along with other transaction information, such as capital history information, inventory information, customer behavior information, and/or employee management and payroll information. Trends in revenue, expense, and/or profitability may also inform the determination of the current assets/earnings value. The customer behavior information and at least a portion of the intellectual property information may inform a goodwill estimation associated with a merchant. The goodwill estimation may inform the determination of the current assets/earnings value.

At block 808, the process 800 may include causing display of an indication of the first merchant and a suggested sale price for the assets on a marketplace platform. The marketplace platform may enable a second merchant operating a second POS terminal to (i) view at least a portion of at least one of the first transaction information or the earnings growth potential and (ii) to initiate a purchase of the assets.

The suggested sale price may be determined based at least in part on the current assets/earnings value and an earnings multiplier determined in connection with a health score associated with the first merchant. The health score may be associated with a scale, which may allow for quantification of the health score. By way of illustration, the health score may be a score from 0 to 100, with 0 being the worst health score indicative of an unhealthy business and 100 being the best health score indicative of a healthy or financially-stable business. The health score may be determined based at least in part on some or all of the transaction information. For example, increased profitability over a period of time may increase the health score, while decreased profitability over the period of time may decrease the health score. Decreased expenses over a period of time may increase the health score, while increased expenses over a period of time may decrease the health score. An increase in the number of new customer may increase the health score, while a decrease in the number of new customers may decrease the health score. An increase in repeat customers may increase the health score, while a decrease in repeat customers may decrease the health score. Increased participation in customer loyalty programs may increase the health score, while decreased participation in customer loyalty programs may decrease the health score. Favorable customer reviews may increase the health score, while unfavorable customer review may decrease the health score. Increased employee retention may increase the health score, while decreased employee retention may decrease the health score. Decreased financing obligations may increase the health score, while increased financing obligations may decrease the health score. It should be understood that the examples provided with respect to determination of the health score are illustrative and are not the exclusive influencers of the health score. Any factor that positively affects a business may increase the health score, while any factor that negatively affects a business may decrease the health score.

The transaction information utilized to determine a health score of a business may be partially or completely weighted. The health score may indicate a state of financial wellbeing of the first merchant in relation to one or more comparable merchants. For example, information associated with profitability may be more heavily weighted than information associated with employee retention. The weighting of transaction information may be static such that certain transaction information is consistently weighted more heavily than other transaction information, and/or the weighting of transaction information may be dynamic and may depend, for example, on the type of business associated with the merchant and/or POS device and/or on a geographic region associated with the merchant and/or the POS device. Other transaction information from the transaction information database may also influence determination of the suggested sale price.

The marketplace platform may provide merchants with a digital marketplace to search for, list, find, buy, and/or sell businesses and/or assets. Additional details associated with the marketplace platform are described with respect to FIGS. 2-4. Generally, the marketplace platform may provide a visual indication, such as through a graphical user interface, of one or more merchants and/or POS devices associated with the remote system and at least a portion of the information described above with respect to the transaction information. The marketplace platform may allow a potential buyer to find businesses for potential purchase as well as information about those businesses to make a more informed decision on which businesses to pursue.

At block 810, the process 800 may include receiving an indication that the purchase of the assets is complete. Alternatively, the indication may comprise an indication that the first merchant and the second merchant have initiated purchase of the assets, have agreed to terms on the purchase of the assets, or at any other point during negotiations.

At block 812, the process 800 may include merging at least a portion of the first transaction information with second transaction information of the second merchant. The merging may be based at least in part on the purchase of the assets being completed. Transaction information associated with the selling merchant may be merged with transaction information associated with the buying merchant. The sale of the business may cause at least a portion of the combined transaction information to change. User profile information may also be merged such that POS devices associated with a selling merchant may be associated with the buying merchant.

The process 800 may additionally, or alternatively, include obfuscating at least a portion of the transaction information to generate obfuscated transaction information. The obfuscated transaction information may exclude identifying information associated with the first merchant. The process 800 may additionally include causing display of the obfuscated transaction information on the marketplace platform. For example, the marketplace platform may be configured to present merchant information for a potential buyer even when one or more merchants have not offered their business and/or assets for sale. By way of further example, a buying merchant may desire to view detailed transaction information that a selling merchant would only want presented without connection to the identification of the selling merchant. In these examples, the remote system may be configured to remove and/or obscure identifying information associated with one or more merchants while maintaining the various types of information described elsewhere herein. A buying merchant may select one of the obfuscated merchant indicators to begin the process of identifying the merchant for the purpose of initiating a sale agreement with that merchant. In this way, merchants that were not looking to sell their business and/or assets may receive informed offers from potential buyers to determine if a sale is desirable.

The process 800 may additionally, or alternatively, include determining comparable merchants to the first merchant based at least in part on at least one of (1) a business type associated with the first merchant and respective business types of the comparable merchants or (2) a geographic region associated with the first merchant and respective geographic regions of the comparable merchants. By way of example, a business type may be "coffee shop," "restaurant," "movie theatre," "plumber," "electrician," etc. By way of example, a geographic region may be a certain distance from the first merchant, and/or within a same city as the first merchant, and/or within a same county as the first merchant, and/or within the same state as the first merchant. The process 800 may additionally include aggregating other transaction information associated with the comparable merchants. The determination of current assets/earnings value, described above at block 806, may be based at least in part on the other transaction information.

The process 800 may additionally, or alternatively, include causing first funds corresponding at least in part to a sale price of the assets to be transferred from a first account associated with a payment processing system to a second account associated with the first merchant. For example, while the first merchant and the second merchant may have agreed to the terms of a sale agreement, the second merchant may not have enough capital to pay the first merchant the sale price. In these examples, the remote system may be configured to assess information associated with the second merchant and/or the first merchant to determine whether to approve financing for the second merchant. If approved, the remote system may be configured to transfer funds from an account associated with the remote system to an account associated with the first merchant.

The process 800 may additionally, or alternatively, include accepting second funds corresponding at least in part to the sale price from the second merchant based at least in part on sales performed at at least one of the first POS terminal or the second POS terminal. The remote system may be configured to determine a repayment schedule for the second merchant to repay the financing. The repayment schedule may be based at least in part on the transaction information associated with the first merchant and/or the second merchant. By way of example, the remote system may determine that a percentage of each sale made by the second merchant using the POS devices will be transferred to an account of the remote system in partial repayment of the sale price. Transferring of the determined percentage of funds may continue until the sale price is repaid. Any interest agreed upon between the second merchant and the remote system may be added to the sale price and repaid on the repayment schedule generated by the remote system.

FIG. 9 depicts a non-limiting flow diagram illustrating a process 900 for business valuation and fund transfer involving a payment processing system.

At block 902, the process 900 may include receiving, from a first merchant computing device associated with a first merchant, transaction information associated with transactions performed between the first merchant and customers. The merchant computing device may at least partly execute a merchant application for configuring the merchant computing device as a first point-of-sale (POS) terminal configured to communicate the transaction information associated with the first POS terminal over a network to a payment processing system. The transaction information may include at least one of revenue data corresponding to revenue associated with the first POS terminal, expense data corresponding to expenses incurred by the first merchant, customer behavior data, or profitability data corresponding to profits associated with the first merchant.

The revenue data may be determined from the transaction information associated with payments accepted by the POS device. For example, monetary amounts associated with payments accepted by the POS device may be aggregated for a period of time to determine the amount of money acquired by the merchant over that period of time. The expense data may be determined from the transaction information associated with expenses associated with the merchant and/or the POS device. The expenses may include the cost of goods and/or services sold by the merchant as well as operating costs. The operating costs may be marginalized such that, for a given transaction, a portion of the operating costs is attributed to that transaction. Expense data may be organized over a period of time, which may be the same or a different period of time that revenue data is organized, as described above. The profitability data may indicate an amount of profit associated with the merchant and/or a POS device over a period of time. The profitability data may be determined by subtracting the expense data from the revenue data for the period of time. The profitability data may additionally take into account factors other than revenue and expenses that may positively or negatively impact profitability. The customer behavior data may include, for example, customer loyalty information, a number of customers that have completed a transaction with a merchant, a number of returning customers, customer satisfaction data, customer loyalty-program participation data, and coupon utilization data.

The transaction information may additionally, or alternatively, include, for example, for a given transaction, the payment object identifier associated with the payment object used during the transaction, the monetary amount of the transaction, the good and/or services sold with respect to the transaction, the name or a naming indicator of the customer, customer information such as contact information, a financial account associated with the payment object and/or the customer, a day and/or time of the transaction, a location where the transaction occurred, loyalty program participation with respect to the transaction, a tip associated with the transaction, and/or a POS device that accepted payment in connection with the transaction. The transaction information may additionally, or alternatively, include charge-back and/or refund data for previously-purchased goods and/or services. The transaction information may additionally, or alternatively, include inventory information, as described above. The transaction information may additionally, or alternatively, include invoice information, as described above. The transaction information may additionally, or alternatively, include employee management information, as described above. The transaction information may additionally, or alternatively, include payroll information, as described above. The transaction information may additionally, or alternatively, include appointment information, as described above. The transaction information may additionally, or alternatively, include capital history, as described above. The transaction information may additionally, or alternatively, include intellectual property ownership information, as described above.

At block 904, the process 900 may include analyzing the transaction information to estimate an earnings growth potential associated with the first merchant. The determination of the earnings growth potential may be based at least in part on some or all of the transaction information. For example, a trend in profitability data over time may be utilized to model potential growth or decline of a business. By way of example, if a merchant has a profitability of $20,000 in its first year of business and that profitability increases by an average of $5,000 year over year for 4 years, the earnings growth potential component 122 may utilize this information to determine an earnings growth potential of $45,000 in the sixth year of business. Other transaction information may be utilized to inform the determination of the earnings growth potential, such as capital history information, which may indicate that financing obligations will terminate in the near future.

At block 906, the process 900 may include determining a current assets/earnings value of assets associated with the first merchant based at least in part on the earnings growth potential. The current assets/earnings value may be determined based at least in part on the earnings growth potential, along with other transaction information, such as capital history information, inventory information, customer behavior information, and/or employee management and payroll information. Trends in revenue, expense, and/or profitability may also inform the determination of the current assets/earnings value. The customer behavior information and at least a portion of the intellectual property information may inform a goodwill estimation associated with a merchant. The goodwill estimation may inform the determination of the current assets/earnings value.

At block 908, the process 900 may include causing display of an indication of the first merchant and a suggested sale price for the assets on a marketplace platform. The marketplace platform enabling the second merchant operating the second POS terminal to initiate a purchase of the assets.

The suggested sale price may be determined based at least in part on the current assets/earnings value and an earnings multiplier determined in connection with a health score associated with the first merchant. The health score may be associated with a scale, which may allow for quantification of the health score. By way of illustration, the health score may be a score from 0 to 100, with 0 being the worst health score indicative of an unhealthy business and 100 being the best health score indicative of a healthy or financially-stable business. The health score may be determined based at least in part on some or all of the transaction information. For example, increased profitability over a period of time may increase the health score, while decreased profitability over the period of time may decrease the health score. Decreased expenses over a period of time may increase the health score, while increased expenses over a period of time may decrease the health score. An increase in the number of new customer may increase the health score, while a decrease in the number of new customers may decrease the health score. An increase in repeat customers may increase the health score, while a decrease in repeat customers may decrease the health score. Increased participation in customer loyalty programs may increase the health score, while decreased participation in customer loyalty programs may decrease the health score. Favorable customer reviews may increase the health score, while unfavorable customer review may decrease the health score. Increased employee retention may increase the health score, while decreased employee retention may decrease the health score. Decreased financing obligations may increase the health score, while increased financing obligations may decrease the health score. It should be understood that the examples provided with respect to determination of the health score are illustrative and are not the exclusive influencers of the health score. Any factor that positively affects a business may increase the health score, while any factor that negatively affects a business may decrease the health score.

The transaction information utilized to determine a health score of a business may be partially or completely weighted. The health score may indicate a state of financial wellbeing of the first merchant in relation to one or more comparable merchants. For example, information associated with profitability may be more heavily weighted than information associated with employee retention. The weighting of transaction information may be static such that certain transaction information is consistently weighted more heavily than other transaction information, and/or the weighting of transaction information may be dynamic and may depend, for example, on the type of business associated with the merchant and/or POS device and/or on a geographic region associated with the merchant and/or the POS device. Other transaction information from the transaction information database may also influence determination of the suggested sale price.

The marketplace platform may provide merchants with a digital marketplace to search for, list, find, buy, and/or sell businesses and/or assets. Additional details associated with the marketplace platform are described with respect to FIGS. 2-4. Generally, the marketplace platform may provide a visual indication, such as through a graphical user interface, of one or more merchants and/or POS devices associated with the remote system and at least a portion of the information described above with respect to the transaction information. The marketplace platform may allow a potential buyer to find businesses for potential purchase as well as information about those businesses to make a more informed decision on which businesses to pursue.

At block 910, the process 900 may include receiving an indication that the purchase of the assets is complete. Alternatively, the indication may comprise an indication that the first merchant and the second merchant have initiated purchase of the assets, have agreed to terms on the purchase of the assets, or at any other point during negotiations.

At block 912, the process 900 may include causing first funds corresponding at least in part to a sale price of the assets to be transferred from a first account associated with the payment processing system to a second account associated with the first merchant. Causing the first funds to be transferred may be based at least in part on the purchase of the assets being completed. For example, while the first merchant and the second merchant may have agreed to the terms of a sale agreement, the second merchant may not have enough capital to pay the first merchant the sale price. In these examples, the remote system may be configured to assess information associated with the second merchant and/or the first merchant to determine whether to approve financing for the second merchant. If approved, the remote system may be configured to transfer funds from an account associated with the remote system to an account associated with the first merchant.

At block 914, the process 900 may include accepting second funds corresponding at least in part to the sale price from the second merchant based at least in part on sales performed at at least one of the first POS terminal or the second POS terminal. The remote system may be configured to determine a repayment schedule for the second merchant to repay the financing. The repayment schedule may be based at least in part on the transaction information associated with the first merchant and/or the second merchant. By way of example, the remote system may determine that a percentage of each sale made by the second merchant using the POS devices will be transferred to an account of the remote system in partial repayment of the sale price. Transferring of the determined percentage of funds may continue until the sale price is repaid. Any interest agreed upon between the second merchant and the remote system may be added to the sale price and repaid on the repayment schedule generated by the remote system.

The process 900 may additionally, or alternatively, include merging at least a portion of the transaction information associated with the first merchant with transaction information associated with the second merchant. The merging may be based at least in part on the purchase of the assets being completed. Transaction information associated with the selling merchant may be merged with transaction information associated with the buying merchant. The sale of the business may cause at least a portion of the combined transaction information to change. User profile information may also be merged such that POS devices associated with a selling merchant may be associated with the buying merchant.

The process 900 may additionally, or alternatively, include obfuscating at least a portion of the transaction information to generate obfuscated transaction information. The obfuscated transaction information may exclude identifying information associated with the first merchant. The process 900 may additionally include causing display of the obfuscated transaction information on the marketplace platform. For example, the marketplace platform may be configured to present merchant information for a potential buyer even when one or more merchants have not offered their business and/or assets for sale. By way of further example, a buying merchant may desire to view detailed transaction information that a selling merchant would only want presented without connection to the identification of the selling merchant. In these examples, the remote system may be configured to remove and/or obscure identifying information associated with one or more merchants while maintaining the various types of information described elsewhere herein. A buying merchant may select one of the obfuscated merchant indicators to begin the process of identifying the merchant for the purpose of initiating a sale agreement with that merchant. In this way, merchants that were not looking to sell their business and/or assets may receive informed offers from potential buyers to determine if a sale is desirable.

The process 900 may additionally, or alternatively, include identifying first customers that have conducted transactions with the first POS terminal based at least in part on first payment object identifiers. The process 900 may additionally include identifying second customers that have conducted transactions with the second POS terminal based at least in part on second payment object identifiers. The process 900 may additionally include determining an amount of overlap between the first customers and the second customers and displaying, on the second POS terminal, an indication of the amount of overlap.

The process 900 may additionally, or alternatively, include determining comparable merchants to the first merchant based at least in part on at least one of (1) a business type associated with the first merchant and respective business types of the comparable merchants or (2) a geographic region associated with the first merchant and respective geographic regions the comparable merchants. By way of example, a business type may be "coffee shop," "restaurant," "movie theatre," "plumber," "electrician," etc. By way of example, a geographic region may be a certain distance from the first merchant, and/or within a same city as the first merchant, and/or within a same county as the first merchant, and/or within the same state as the first merchant. The process 900 may additionally include aggregating other transaction information associated with the comparable merchants. The determination of current assets/earnings value, described above at block 906, may be based at least in part on the other transaction information.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system comprising:
one or more processors; and
non-transitory computer-readable media storing instructions that, when executed by the one or more processors, causes the one or more processors to perform operations comprising:
receiving, at a payment processing system and from merchant computing devices associated with merchants, transaction information associated with payment transactions performed between the merchants and customers, the merchant computing devices each executing an instance of a merchant application provided by the payment processing system and for configuring the merchant computing devices as point-of-sale (POS) terminals configured to perform the payment transactions, the merchants including a first merchant associated with a first merchant account having first account data and the merchants including a second merchant associated with a second merchant account having second account data;
applying a machine learning model configured to determine financing offers to associate with a transfer of control between the first merchant and the second merchant;
training the machine learning model utilizing a training dataset indicating classifications of the merchants as determined by the payment processing system;
determining, utilizing the trained machine learning model, at least one financing offer to be associated with the transfer of control;
initiating, by at least associating the at least one financing offer to the transfer of control, the transfer of control from the second merchant to the first merchant, wherein a first portion of information associated with the second account data is obfuscated prior to initiating the transfer of control, wherein the information associated with the second account data comprises one or more of the transaction information, asset information, earnings information, health score information, suggested sale price information, or identification information associated with the second merchant;
receiving an indication that the transfer of control is complete;
associating, based at least in part on the indication, the first account data with the second account data such that the first account data and the second account data are both associated with the first merchant instead of the second merchant; and
enabling, based at least in part on the associating, a first POS terminal associated with the first merchant to access the second account data.

2. The system of claim 1, the operations further comprising associating, based at least in part on the transfer of control, first information indicating the first POS terminal associated with the first merchant with second information indicating a second POS terminal associated with the second merchant such that the first POS terminal and the second POS terminal are both associated with the first merchant instead of the second merchant.

3. The system of claim 1, wherein:
the first account data includes first payment transaction data representing first payment transactions associated with the first merchant;
the second account data includes second payment transaction data representing second payment transactions associated with the second merchant; and
associating the first account data with the second account data includes causing the second payment transaction data to be included in the first account data.

4. The system of claim 1, wherein:
the first account data includes first customer identifier data representing first customers associated with the first merchant;
the second account data includes second customer identifier data representing second customers associated with the second merchant; and
associating the first account data with the second account data includes causing the second customer identifier data to be included in the first account data.

5. The system of claim 1, wherein:
the first account data includes first inventory data indicating a first inventory of at least one product associated with the first merchant;
the second account data includes second inventory data indicating a second inventory of the at least one product; and
associating the first account data with the second account data includes increasing the first inventory by an amount indicated by the second inventory.

6. The system of claim 1, wherein:
the first account data includes first revenue data representing a first revenue associated with the first merchant;
the second account data includes second revenue data representing a second revenue associated with the second merchant; and
associating the first account data with the second account data includes increasing the first revenue by an amount indicated by the second revenue.

7. The system of claim 1, wherein receiving the indication comprises receiving the indication that the first merchant has purchased a business associated with the second merchant.

8. The system of claim 1, the operations further comprise providing, based at least in part on the transfer of control, a second portion of the information different than the first portion of the information, without obfuscation, to the first merchant.

9. The system of claim 1, the operations further comprising, based at least in part on the transfer of control, configuring the first POS terminal associated with the first merchant to exchange data with a second POS terminal associated with the second merchant.

10. A method comprising:
receiving, at a payment processing system and from merchant computing devices associated with merchants, payment transaction information associated with payment transactions performed between the merchants and customers, the merchant computing devices each executing an instance of a merchant application provided by the payment processing system and for configuring the merchant computing devices as point-of-sale (POS) terminals configured to perform the payment transactions, the merchants including a first merchant associated with first account data and a second merchant associated with second account data;
applying a machine learning model configured to determine financing offers to associate with a transfer of control between the first merchant and the second merchant;

training the machine learning model utilizing a training dataset indicating classifications of the merchants as determined by the payment processing system;

determining that the transfer of control from the second merchant to the first merchant is requested;

determining, utilizing the trained machine learning model, at least one financing offer to be associated transaction condition associate with the transfer of control;

initiating, by at least associating the at least one financing offer to the transfer of control, the transfer of control from the second merchant to the first merchant, wherein a first portion of information associated with the second account data is obfuscated prior to initiating the transfer of control, wherein the information associated with the second account data comprises one or more of the payment transaction information, asset information, earning information, health score information, suggested sale price information, or identification information associated with the second merchant;

receiving an indication that the transfer of control is complete;

associating, based at least in part on the indication, the first account data of the first merchant with the second account data of the second merchant such that the first account data and the second account data are both associated with the first merchant instead of the second merchant; and enabling, based at least in part on the associating, a first POS terminal associated with the first merchant to access the second account data.

11. The method of claim 10, further comprising associating, based at least in part on the transfer of control, first information indicating the first POS terminal from the first merchant with second information indicating a second POS terminal from the second merchant such that the first POS terminal and the second POS terminal are both associated with the first merchant instead of the second merchant.

12. The method of claim 11, wherein associating the first information indicating the first POS terminal with the second information indicating the second POS terminal includes:

storing the second information in the first account data; and removing the second information from the second account data.

13. The method of claim 10, wherein:

the first account data includes first payment transaction data representing first payment transactions associated with the first merchant;

the second account data includes second payment transaction data representing second payment transactions associated with the second merchant; and associating the first account data with the second account data includes causing the second payment transaction data to be included in the first account data.

14. The method of claim 10, wherein:

the first account data includes first customer identifier data representing first customers associated with the first merchant;

the second account data includes second customer identifier data representing second customers associated with the second merchant; and associating the first account data with the second account data includes causing the second customer identifier data to be included in the first account data.

15. The method of claim 10, wherein:

the first account data includes first inventory data indicating a first inventory of at least one product associated with the first merchant;

the second account data includes second inventory data indicating a second inventory of the at least one product; and associating the first account data with the second account data includes increasing the first inventory by an amount indicated by the second inventory.

16. The method of claim 10, wherein:

the first account data includes first revenue data representing a first revenue associated with the first merchant;

the second account data includes second revenue data representing a second revenue associated with the second merchant; and associating the first account data with the second account data includes increasing the first revenue by an amount indicated by the second revenue.

17. The method of claim 10, wherein:

the first merchant is associated with a first user profile having an absence of payment transaction data associated with payment transactions; and the second merchant is associated with a second user profile having payment transaction data.

18. The method of claim 10, wherein the machine learning model comprises an ensemble learning model.

19. The method of claim 10, wherein the at least one financing offer is further based at least in part on:

determining one or more other comparable merchants to the first merchant based on a geographic region associated with the first merchant and respective geographic regions of the one or more other comparable merchants; and wherein determining the at least one financing offer is based at least in part on other account data associated with the one or more other comparable merchants.

20. The method of claim 10, wherein the indication corresponds to an initiation of a purchase of assets or an agreement associated with the transfer of assets.

* * * * *